(12) United States Patent
Nelluri et al.

(10) Patent No.: US 12,524,519 B2
(45) Date of Patent: Jan. 13, 2026

(54) PROTECTION ARCHITECTURE USING PROOF OF INTEGRITY ON DISTRIBUTED LEDGERS

(71) Applicant: Wells Fargo Bank, N.A., San Francisco, CA (US)

(72) Inventors: Govinda Rajulu Nelluri, Hyderabad (IN); Vinay K. Pandey, San Francisco, CA (US); Shashank Raju Birudharaju, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 133 days.

(21) Appl. No.: 18/595,587

(22) Filed: Mar. 5, 2024

(65) Prior Publication Data

US 2025/0286741 A1  Sep. 11, 2025

(51) Int. Cl.
*H04L 9/32* (2006.01)
*H04L 9/00* (2022.01)

(52) U.S. Cl.
CPC .................. *H04L 9/50* (2022.05); *H04L 9/32* (2013.01); *H04L 2209/56* (2013.01)

(58) Field of Classification Search
CPC .......... H04L 9/50; H04L 9/32; H04L 2209/56
See application file for complete search history.

(56) References Cited

U.S. PATENT DOCUMENTS

| | | | |
|---|---|---|---|
| 11,070,449 B2 | 7/2021 | Dakshinyam et al. | |
| 11,416,832 B2 | 8/2022 | Gamaroff et al. | |
| 11,509,464 B2 | 11/2022 | Gutierrez-Sheris | |
| 11,514,448 B1 | 11/2022 | Liberman | |
| 12,002,020 B2 | 6/2024 | Gamaroff et al. | |
| 12,056,766 B2* | 8/2024 | Ingargiola | G06Q 20/4016 |
| 2018/0101906 A1 | 4/2018 | Mcdonald et al. | |
| 2023/0004970 A1 | 1/2023 | Jakobsson et al. | |
| 2023/0275759 A1* | 8/2023 | Majumdar | H04L 9/3239 713/171 |
| 2023/0319039 A1* | 10/2023 | Murdoch | H04L 63/0884 726/9 |
| 2023/0394063 A1* | 12/2023 | Zhang | G06F 16/27 |
| 2024/0171406 A1* | 5/2024 | Bercik | H04L 9/3247 |

* cited by examiner

*Primary Examiner* — Lynn D Feild
*Assistant Examiner* — Vladimir I Gavrilenko
(74) *Attorney, Agent, or Firm* — Foley & Lardner LLP

(57) ABSTRACT

Systems, methods, and computer-readable storage media for restricting exchanges using a proof of integrity model. One system includes memory and at least one processing circuit configured to receive, from a node on a first DLT network, an exchange request, the exchange request includes an amount of a digital asset to exchange, a content item, and a destination identifier. The at least one processing circuit is further configured to generate an exchange record and validate the exchange record in the amount of the digital asset based on a protection model. The at least one processing circuit is further configured to authorize, based on a consensus model, the exchange corresponding with the validated exchange record including the appended protection parameter. The at least one processing circuit is further configured to generate a new blockchain block on the first DLT network and transmit, to a second DLT network, an exchange notification.

12 Claims, 8 Drawing Sheets

PROTECTION ARCHITECTURE USING PROOF OF INTEGRITY ON DISTRIBUTED LEDGERS

BACKGROUND

In a computer networked environment, users and entities like individuals or companies may desire to restrict usage of assets on networks.

SUMMARY

Some arrangements relate to a system, including memory and at least one processing circuit configured to receive, from a node on a first DLT network, an exchange request for an exchange, wherein the exchange request includes an amount of a digital asset to exchange, a content item, and a destination identifier. The at least one processing circuit is further configured to generate an exchange record corresponding to the exchange of the amount of the digital asset, the exchange record including at least a source identifier, the destination identifier, and the amount of the digital asset. The at least one processing circuit is further configured to validate the exchange record in the amount of the digital asset based on a protection model, wherein validating includes generating a protection parameter to append to the exchange record based on the content item. The at least one processing circuit is further configured to authorize, based on a consensus model, the exchange corresponding with the validated exchange record including the appended protection parameter. The at least one processing circuit is further configured to generate a new blockchain block on the first DLT network including the validated-authorized exchange record. The at least one processing circuit is further configured to transmit, to a gateway interface of a second DLT network, an exchange notification including the validated-authorized exchange record.

In some arrangements, validating, based on the protection model, includes executing a dimensional analysis, using one or more smart contracts, of the content item and exchange information of the exchange request, and wherein the at least one processing circuit is further configured to receive, from a protection system, protection code for executing the protection model.

In some arrangements, validating is performed by a protection node of a plurality of nodes of the first DLT network, and wherein validating further includes storing the content item on an external ledger, the protection parameter including a pointer to the content item stored on the external ledger.

In some arrangements, the external ledger is accessible to the protection node of the first DLT network and a protection node of a plurality of nodes of the second DLT network, and wherein the external ledger is inaccessible to other nodes of the plurality of nodes of the first DLT network and other nodes of the plurality of nodes of the second DLT network.

In some arrangements, the content item includes multimedia data corresponding to the exchange, and wherein the protection parameter corresponds to a type of protection, wherein the type of protection corresponds with at least one of a ransom protection, a fraud protection, a financial anomaly protection, a variance protection, or a fiscal compliance protection.

In some arrangements, the validated-authorized exchange record is transmitted via the gateway interface to a protection node of a plurality of nodes of the second DLT network, wherein the protection node of the second DLT network includes the protection code for executing the protection model, and wherein a use of the amount of the digital asset on the second DLT network is locked based on the protection parameter, and wherein the protection model is a proof of integrity algorithm.

In some arrangements, the at least one processing circuit is further configured to communicably couple the node of the first DLT network to the protection node of the second DLT network, in response to receiving a confirmation from the node corresponding with the protection parameter, request a retrieval of the amount of the digital asset, wherein the confirmation includes an indication the node received a return action based on the exchange, receive a new exchange notification including a return exchange record corresponding with the amount of the digital asset, and credit the amount of the digital asset to a sender account on the first DLT network corresponding with the source identifier.

In some arrangements, prior to generating the exchange record the at least one processing circuit is further configured to verify an availability of the amount of the digital asset in a sender's account on the first DLT network and initiate a locking mechanism on the first DLT network to temporarily secure or debit the amount of the digital asset.

Some arrangements relate to a system, including a protection system configured to generate and deploy protection code to a plurality of protection nodes of a plurality of DLT networks. The system further includes a first DLT network of the plurality of DLT networks including a first plurality of nodes and a first protection node, the first DLT network configured to, in response to receiving an exchange request from a node of the first plurality of nodes, generate an exchange record corresponding to an exchange of an amount of a digital asset, the exchange record including at least a source identifier, a destination identifier, and the amount of the digital asset. The first DLT network is further configured to validate, by the first protection node, the exchange record in the amount of the digital asset based on a protection model corresponding to the protection code, wherein validating includes generating a protection parameter to append to the exchange record based on a content item. The first DLT network is further configured to authorize, based on a first consensus model, the exchange corresponding with the validated exchange record. The first DLT network is further configured to generate a new blockchain block on the first DLT network including the validated-authorized exchange record and the protection parameter. The first DLT network is further configured to transmit, to a gateway interface of a second DLT network, an exchange notification including the validated-authorized exchange record. The system further includes the second DLT network of the plurality of DLT networks including a second plurality of nodes and a second protection node, the second DLT network configured to receive the exchange notification from the gateway interface. The second DLT network is further configured to validate, by the second protection node, the exchange notification based on the protection model corresponding to the protection code. The second DLT network is further configured to authorize, based on a second consensus model, the exchange corresponding with the validated exchange notification. The second DLT network is further configured to credit the amount of the digital asset to a recipient account on the second DLT network corresponding with the destination identifier. The second DLT network is further configured to generate a confirmation blockchain block on the second DLT network including the validated-authorized exchange notification and the protection parameter.

In some arrangements, validating, by the first protection node based on the protection model, includes executing a dimensional analysis, using one or more smart contracts, of the content item and exchange information of the exchange request, and wherein the first DLT network and the second DLT network are further configured to receive, from the protection system, the protection code for executing the protection model.

In some arrangements, the system further includes an external ledger configured to store the content item and restrict access to a plurality of content items stored, the protection parameter including a pointer to the content item stored on the external ledger.

In some arrangements, the external ledger is accessible to the first protection node of the first DLT network and the second protection node of the second DLT network, and wherein the external ledger restricts access to other nodes of the first plurality of nodes of the first DLT network and other nodes of the second plurality of nodes of the second DLT network.

In some arrangements, the content item includes multimedia data corresponding to the exchange, and wherein the protection parameter corresponds to a type of protection, wherein the type of protection corresponds with at least one of a ransom protection, a fraud protection, a financial anomaly protection, a variance protection, or a fiscal compliance protection.

In some arrangements, a use of the amount of the digital asset on the second DLT network is locked based on the protection parameter, and wherein the use of the amount of the digital asset is unlocked based on the second protection code receiving additional information corresponding with the exchange request, and wherein the protection model is a proof of integrity algorithm.

In some arrangements, the first DLT network is further configured to communicably couple the node of the first DLT network to the second protection node of the second DLT network, in response to receiving a confirmation from the node corresponding with the protection parameter, request a retrieval of the amount of the digital asset, wherein the confirmation includes an indication the node received a return action based on the exchange, receive, from the second protection node, a new exchange notification including a return exchange record corresponding with the amount of the digital asset, and credit the amount of the digital asset to a sender account on the first DLT network corresponding with the source identifier.

In some arrangements, the second DLT network is further configured to receive from a node of the second plurality of nodes on the second DLT network, a subsequent exchange request for a subsequent exchange of at least a portion of the amount of the digital asset and prohibit the subsequent exchange based on the protection parameter on the confirmation blockchain block.

Some arrangements relate to a method, including receiving, by at least one processing circuit from a node on a first DLT network, an exchange request for an exchange, the exchange request includes an amount of a digital asset to exchange, a content item, and a destination identifier. The method further includes generating, by the at least one processing circuit, an exchange record corresponding to the exchange of the amount of the digital asset, the exchange record including at least a source identifier, the destination identifier, and the amount of the digital asset. The method further includes validating, by the at least one processing circuit, the exchange record in the amount of the digital asset based on a protection model, wherein validating includes generating a protection parameter to append to the exchange record based on the content item. The method further includes authorizing, by the at least one processing circuit based on a consensus model, the exchange corresponding with the validated exchange record including the appended protection parameter. The method further includes generating, by the at least one processing circuit, a new blockchain block on the first DLT network including the validated-authorized exchange record. The method further includes transmitting, by the at least one processing circuit to a gateway interface of a second DLT network, an exchange notification including the validated-authorized exchange record.

In some arrangements, validating, based on the protection model, includes executing a dimensional analysis, using one or more smart contracts, of the content item and exchange information of the exchange request, and wherein the method further includes receiving, by the at least one processing circuit from a protection system, protection code for executing the protection model, and wherein validating is performed by a protection node of a plurality of nodes of the first DLT network, and wherein validating further includes storing the content item on an external ledger, the protection parameter including a pointer to the content item stored on the external ledger.

In some arrangements, the content item includes multimedia data corresponding to the exchange, and wherein the protection parameter corresponds to a type of protection, wherein the type of protection corresponds with at least one of a ransom protection, a fraud protection, a financial anomaly protection, a variance protection, or a fiscal compliance protection.

In some arrangements, the validated-authorized exchange record is transmitted via the gateway interface to a protection node of a plurality of nodes of the second DLT network, wherein the protection node of the second DLT network includes the protection code for executing the protection model, and wherein a use of the amount of the digital asset on the second DLT network is locked based on the protection parameter, and wherein the protection model is a proof of integrity algorithm.

Figure 1A:
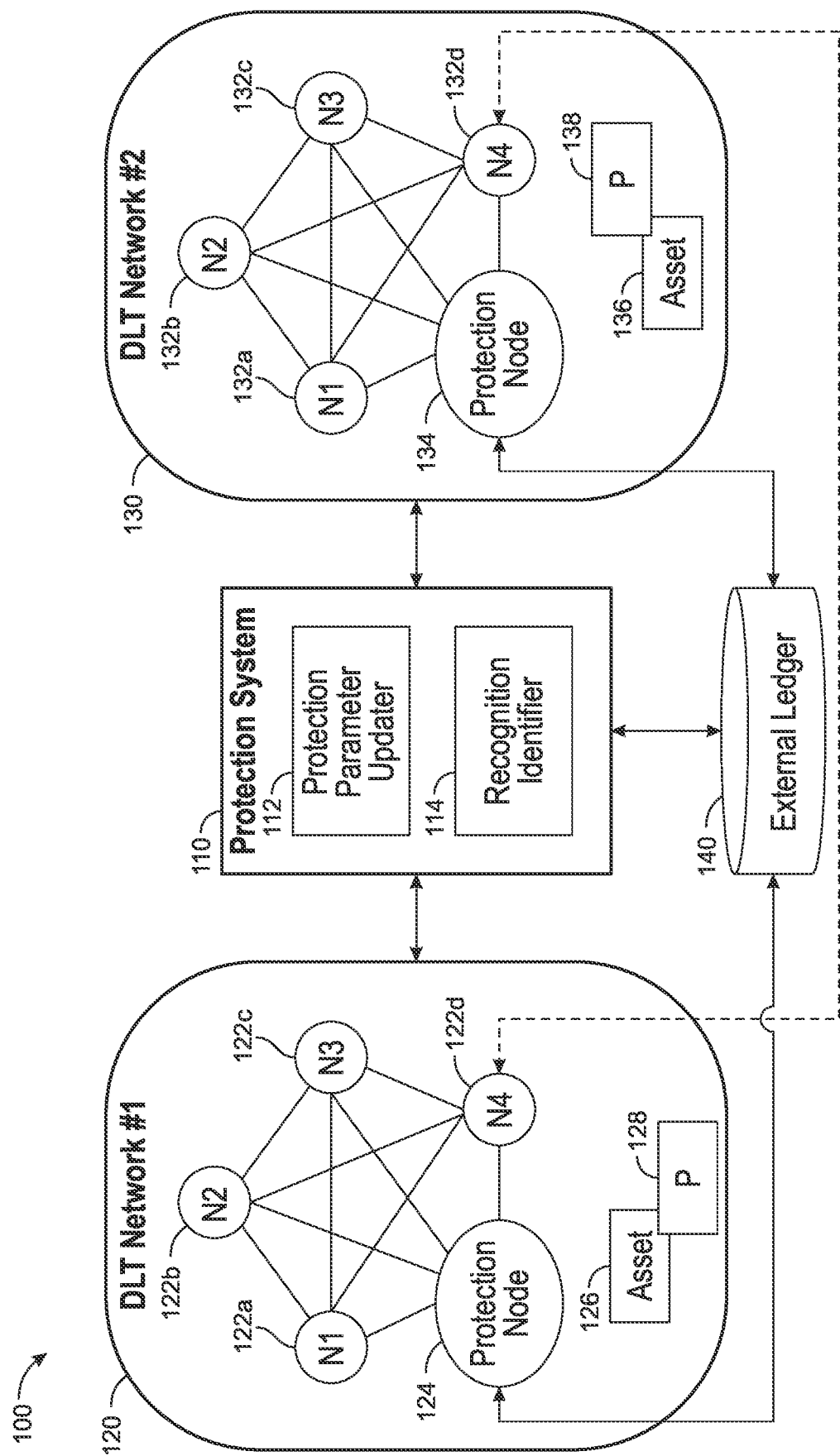
FIG. 1A is a block diagram depicting an example of a proof of integrity (PoI) architecture, according to some arrangements.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the figures, systems, apparatuses, methods, and non-transitory computer-readable media for a protection model implemented on a PoI architecture. Generally, the protection system of the PoI architecture employs and configures a protection model within distributed ledger technology (DLT) networks to reduce or eliminate the impact of cyber-attacks (e.g., ransomware, denial-of-service (DoS) or distributed denial of service (DDoS) attacks, phishing, spoofing, code injection attack, supply chain attack, domain name system (DNS) tunneling). The protection system incorporates an improved protection model integrated into the nodes of the DLT network. It can function to manage the transfer of cryptocurrency between a victim and an attacker. For example, when a transfer is initiated under duress, such as in a ransomware scenario, the protection system embeds a specialized protection parameter into the cryptocurrency. This protection parameter is encoded within a smart contract, which is appended to the block's header created during the initial exchange. The important aspect of this mechanism is that it allows the victim to fulfill the attacker's demand, thereby unlocking their system. However, it simultaneously restricts the attacker's ability to further transfer the tainted cryptocurrency, effectively neutralizing the financial benefit of the attack.

In the context of the current cybersecurity landscape, where ransomware damages have escalated to an alarming 11.5 billion dollars, the majority of these attacks (approximately 85%) demand payment in cryptocurrencies due to their decentralized and non-traceable nature. Traditional responses involve victims transferring funds, often in Bitcoin or similar digital assets, to settle the demand. However, the protection system described herein offers an innovative solution in this scenario. It utilizes a proof of integrity (PoI) based DLT network not only for transferring funds between decentralized ledgers but also for implementing a verification process. This process involves the identification of parties and the integration of a ransom flag or protection parameter during asset transfers. When assets obtained through illicit means are moved across the network, the protection system detects the ransom flag and withholds consensus due to a failure in proof of integrity. The protection system thus ensures transaction validation, identifies the ransom flag, and enforces a PoI model. This mechanism is embedded in the DLT ecosystem as a protection parameter contract within the transaction boundary, specifically in the block header.

The protection system also represents improvements over existing fraud detection and prevention systems in the broader context of asset exchanges. Traditional fraud prevention systems, particularly in the realm of credit card transactions or conventional financial exchanges, often operate on a binary decision-making model. If an exchange is flagged for potential fraud or identified as high-risk, these systems typically halt the transaction entirely. While effective in preventing immediate fraud, this approach can create significant disruption and inconvenience for legitimate users whose transactions are falsely flagged. It also lacks the subtlety needed in scenarios where the legitimacy of a transaction is ambiguous.

The protection system, however, introduces an improved architecture. Instead of outright blocking a suspicious transaction, it embeds a protection parameter into the transaction itself. This parameter allows the transaction to proceed but under a state of conditional approval. The improved aspect of this system is that it enables subsequent monitoring and control of the assets involved in the transaction. For example, if a cryptocurrency transfer is identified as part of a fraudulent activity, the embedded protection parameter can be activated to restrict further movement of these assets, effectively quarantining them within the network. This approach provides a dual benefit, it minimizes disruptions for legitimate transactions that might resemble fraudulent activity and offers a more dynamic and responsive mechanism to control assets post-transaction.

Moreover, the protection system 110's integration with DLT networks adds an additional layer of security and flexibility. The decentralized nature of these networks, combined with the system's ability to enforce PoI protocols (or models), ensures a more distributed and robust monitoring process. This not only enhances the detection and prevention of fraud but also adapts to the evolving patterns of fraudulent activities. The protection system's capacity to append a protection parameter to a transaction's block header and subsequently monitor and control the asset provides a solution that addresses the limitations of existing fraud prevention methods.

As used herein, "smart contract" generally refers to a self-executing code (e.g., in a ledger network or other system) that executes when a set of conditions that have been agreed upon by the parties of the smart contract are met. Although the FIGS. and specification generally discuss utilizing smart contracts on funds or digital assets, the systems, methods, and apparatuses disclosed herein can also be used for a plurality of types of non-fungible or fungible assets, such as, but not limited to, commodities, common shares, options, dollar bills, fiat currency, digital currency, tokens, deeds, leases, wills, other exchanges, non-smart contracts, traditional legal contracts, financial disbursements, taxes, and other types of non-fungible or fungible assets parties use and exchange. Parties to the smart contract for funds or digital assets or other types of non-fungible or fungible assets may be individuals, companies, organizations, entities, providers, the government, and so on.

As used herein, a "protection model (or PoI model)" generally refers to a system or methodology implemented within a blockchain or distributed ledger technology (DLT) network to ensure that transactions and digital assets adhere to integrity and authenticity standards. This model employs smart contracts and other blockchain mechanisms to monitor, validate, and potentially restrict transactions based on predefined criteria. The protection model (e.g., executed by a processing circuit of the protection nodes of the DLT networks) can analyze transaction patterns, receive content items, identify anomalous behavior, and apply protective measures in real-time.

In some embodiments, the protection model operates by embedding specific parameters or flags into transactions, which serve as markers or triggers for additional scrutiny or action. This process ensures that each transaction is continuously evaluated for its integrity and legitimacy. For example, in a ransomware attack, the protection model would ensure that any cryptocurrency transferred is marked and monitored, preventing further unauthorized or suspicious transfers. Moreover, the PoI model can be dynamically updated to reflect new threat patterns and compliance requirements, enhancing its effectiveness over time.

The protection model functions in conjunction with traditional consensus mechanisms, such as proof of work or proof of stake, providing an additional layer of transaction validation that is directed to the ethical and legal aspects of asset transfers. This dual-layer approach improves the robustness and trustworthiness of the network by not only securing the ledger against fraudulent activities but also ensuring that all transactions comply with the set integrity standards.

Specifically, Proof of Integrity (PoI) differs from traditional consensus models like Proof of Work (PoW) or Proof of Stake (PoS) in its core objectives and operational mechanisms within a blockchain or Distributed Ledger Technology (DLT) network. While PoW and PoS are primarily concerned with maintaining the overall integrity and security of the blockchain, validating transactions, and achieving consensus among network participants, PoI focuses explicitly on the ethical and legal compliance of transactions. PoI employs smart contracts to enforce compliance checks and fraud prevention measures. This might involve analyzing content items received from senders or receivers, transaction history, source and destination of assets, and adherence to regulatory standards. In contrast, PoW and PoS mechanisms are designed to secure the network against double-spending and other fraudulent activities, typically involving computational challenges (in PoW) or stake-based participation (in PoS) to validate transactions and add new blocks to the chain.

It should be understood that "real-time" as used herein does not necessarily mean instantaneous, but rather refers to a process or system in which information is updated at a frequency that is suitable for its intended purpose, thereby enabling timely responses and decisions based on the most recent data available.

As used herein, a "digital asset" may be a data package or structure including information (e.g., values in fields) and an amount of digital or virtual currency that is owned by one or more parties (e.g., user, individual, institution, company, or so on) and used to perform exchanges (e.g., for goods or services) in a computer networked environment. The digital asset may be encrypted and decrypted using one or more public and private key pairs (sometimes referred to as a "verification and signing key pair"). In some arrangements, a digital asset may be a digital form of a fiat currency of one or more nations, one or more countries, or one or more regions. The digital asset may be a cryptocurrency (e.g., Bitcoin, Ethereum, Stablecoin Tether (USDT), USD Coin (USDC)) or derived (for example, as a token) from cryptocurrency. The digital asset may be a central bank digital currency (CBDC) (e.g., Digital USD, Digital Euro, Digital Japanese Yen, Digital British Pound, Digital Swiss Franc) or derived (for example, as a token) from CBDC. In various arrangements, the digital asset can include information in one or more metadata fields that may be modified by the one or more parties. Furthermore, smart contracts can be configured to provide one or more functionalities of the digital asset and can be wrapped into the data package or block data of the digital asset.

Additionally, in the context of the exchange process involving digital assets within DLT network, public and private key pairs can be used to ensure the security and integrity of exchanges. The key pairs can be used in the encryption and decryption process that safeguards the digital assets and validates transactions. For example, when a user initiates an exchange request on a first DLT network, their private key can be used to sign the transaction. This digital signature verifies that the transaction has been initiated by the rightful owner of the digital asset. The transaction, including details like the source identifier, destination identifier, and amount of MBC, is then encrypted using the user's private key. This encryption ensures that the transaction details remain secure and tamper-proof as they traverse the network. In this example, on the receiving end, the processing circuits associated with a second DLT network can use the sender's public key to decrypt and validate the exchange notification. The public key can decrypt the transaction encrypted by the corresponding private key, thereby confirming the authenticity and integrity of the transaction. Moreover, the process of creating a new block on the blockchain in both DLT networks can include the use of public and private keys. When a new block is created and added to the blockchain, it can be encrypted with a private key and can be verified by anyone on the network using the corresponding public key.

Referring now to FIG. 1A, a block diagram depicting an example of a proof of integrity (PoI) architecture 100 is shown, according to some arrangements. The PoI architecture 100 is shown to include a protection computing system 110, DLT network 120, nodes 122a-122d, protection node 124, DLT network 130, nodes 132a-132d, protection node 134, and an external ledger 140. The plurality of devices and/or systems 110, 120, 130, and 140 may initiate, collect, and/or route (e.g., provide) data over a network.

Each of the computing systems and nodes described herein can include one or more processing circuits and memory. The one or more processing circuits can include a microprocessor, an application specific integrated circuit (ASIC), a field-programmable gate array (FPGA), and so on, or combinations thereof. A memory can include, but is not limited to, electronic, optical, magnetic, or any other storage or transmission device capable of providing processor with program instructions. Instructions can include code from any suitable computer programming language. It should also be understood that all communication between systems described herein can be either wireless or wired, depending on the network setup. Wireless communication might use protocols like Wi-Fi or Bluetooth, while wired communication could use Ethernet or fiber optic cables.

In some embodiments, the protection system 110 is configured to generate and manage DLT networks. To generate DLT networks, protection system 110 can execute a series of instructions for initializing a distributed ledger. This can include allocating network resources (e.g., memory, processing power) and setting up network parameters like consensus protocols and cryptographic keys. Nodes can then be instantiated, each running an instance of the ledger and maintaining its state.

The protection system 110 and the external ledger 140 can access and exchange various data using data exchange protocols. In some embodiments, protection system 110 sends and receives data packets, using network protocols (e.g., TCP/IP) and data formats (e.g., JSON, XML). The protection system 110 can analyze content items stored in the external ledger 140. The analysis can be used to generate new protection parameters or improve future recognitions made by the recognition identifier 114. In some embodiments, the external ledger 140, when communicating with protection system 110, uses data exchange formats and protocols. The external ledger 140 can provide (or provide access to) content items and associated data related to proof of integrity of various digital assets exchanged on DLT networks.

In some embodiments, the protection system 110 includes a protection parameter updater 112 and the recognition identifier 114. Generally, the protection system 110 can generate and execute a protection model that enforces proof of integrity (PoI) across DLT networks. This functionality can restrict and/or prohibit the circulation of digital assets obtained illegally or through coercion, such as in ransomware attacks. The protection model, integrated into the system's nodes, includes an algorithm for PoI, which is part of the protection code executed by these nodes.

The recognition identifier 114 is configured to implement a multi-dimensional recognition mechanism within the protection nodes as part of the protection model. It enables the nodes to execute PoI artifact recognition. The protection parameter updater 112 can be configured to attach the protection flag to a transaction. Specifically, the protection parameter updater 112 appends this flag to the block header of a newly created block during the exchange. Consequently, when an attacker attempts to transfer the digital asset further, the presence of the protection parameter prevents consensus from other nodes in the network, rendering the asset unusable. This control is exerted by integrating the protection parameter with the DLT network.

The protection parameter updater 112 is designed to communicate with and manage the protection parameters across various nodes in DLT networks, such as protection node 124 in DLT network 120 and protection node 134 in DLT network 130. Specifically, the protection parameter updater 112 can generate and integrate protection parameters or flags within transactions executed by these protection nodes. Once embedded in the block headers on a DLT network, these protection parameters acquire the capability to restrict or completely prohibit the utilization of digital assets in future exchanges. This is particularly relevant in scenarios like ransomware attacks, where, post-transaction, the victim regains access to their data or computer system while the attacker's subsequent use of the digital assets is controlled.

For example, where an attacker demands a digital asset (e.g., Bitcoin), the victim can attach various forms of proof (referred to as "content items", such as emails, agreements, or text messages) of integrity to the protection node while transferring the cryptocurrency. These content items, stored on the external ledger 140 with a pointer on the blockchain ledger, might include communication records from the attacker stipulating ransom demands. On the other hand, the attacker is also capable of submitting their proof of integrity to the protection node. The protection nodes, implementing the protection model, can perform a dimensional analysis based on the protection model to determine the legitimacy of the transaction, thereby acting as an adjudicator.

In another example involving a cryptocurrency transaction, it may not be necessary to set a protection parameter initially during the first exchange. However, proof of integrity might be required for verification by the protection node in any subsequent transactions. This principle extends to cross-border transactions as well, where the reasons for the transfer must be provided to facilitate the transaction's approval. The protection parameter can be activated in response to certain triggers, such as suspicious transaction attributes, including geographical locations or the amount being transferred.

The recognition identifier 114 enhances the protection model by generating and implementing a dimensional analysis within the proof of integrity algorithm. This includes deploying one or more smart contracts, which are executed upon receiving a transaction request (e.g., from a node of a first DLT network) or an exchange notification (e.g., from a protection node on a first DLT network, received by a protection node of a second DLT network). In some embodiments, recognition identifier 114 can provide the protection nodes with the ability to assess the transaction's integrity, drawing on multiple data points and patterns (i.e., multi-dimensional).

The proof of integrity (PoI) architecture 100 can also include multiple DLT networks 120 and 130 that can execute smart contracts and perform exchanges with specific assets (e.g., funds or digital assets). The DLT networks can include a plurality of nodes that are interconnected with one another to form a peer-to-peer network. As shown in FIG. 1A, DLT network 120 includes nodes 122a-122d and 124 (collectively referred to herein as "DLT Network #1 nodes") that are interconnected with one another to form the peer-to-peer network. Each of the DLT Network #1 nodes on the distributed ledger network includes hardware elements, one or more processors (e.g., any general purpose or special purpose processor), and/or is operably coupled to one or more transitory and/or non-transitory storage mediums and/or memory devices (e.g., any computer-readable storage media, such as magnetic storage, optical storage, flash storage, RAM, and so on). DLT network 130 also includes nodes 132a-d and 134 (collectively referred to herein as "DLT Network #2 nodes") that are interconnected with one another to form the peer-to-peer network. Each of the DLT Network #2 nodes on the distributed ledger network includes hardware elements, one or more processors (e.g., any general purpose or special purpose processor), and/or is operably coupled to one or more transitory and/or non-transitory storage mediums and/or memory devices (e.g., any computer-readable storage media, such as magnetic storage, optical storage, flash storage, RAM, and so on). The PoI architecture 100 may be implemented and configured using various types of blockchain ledgers, such as Hyperledger or Ethereum. The selection of the blockchain ledger in the PoI architecture 100 is based on specific needs like transaction speed, consensus mechanism, and security requirements.

In some embodiments, the protection nodes 124 and 134 operate by scrutinizing exchange records or exchange notifications that are generated as a result of authorized transactions in a first DLT network, intended for transfer to a second DLT network. Their function is to validate these records based on the established protection model, which is guided by the protection code. The validation process includes an analysis of the transaction details and one or more content items (if provided), ensuring their compliance with the protection model's standards.

During the validation process, these protection nodes can generate a protection parameter. The parameter can be derived from a dimensional analysis of the exchange notification or exchange record. This analysis encompasses multiple dimensions, such as the transaction's origin, destination, value, and context. Once the protection parameter is generated, the protection node can append it to the exchange record. The protection parameter can serve as a marker, signaling to other nodes in the network the evaluated status of the transaction based on the protection model's criteria. It ensures that only transactions that meet the standards of the protection model are validated and allowed to proceed. Accordingly, protection nodes 124 and 134 are used to maintain the security and integrity of transactions across DLT networks. Their role in validating exchanges, generating protection parameters based on comprehensive analysis, and appending these parameters to transaction records improves the overall robustness and reliability of the DLT ecosystem.

Protection node 124, shown in the first DLT network (DLT network 120), can validate exchange records. This process can occur before any authorization or initiation of a transaction to a second DLT network. In some embodiments, the validation by protection node 124 can include an examination of the exchange record including any content items that comply with the established protection model. This includes assessing the integrity of the transaction based on various parameters set within the protection code. Once an exchange record passes this scrutiny and is validated (with or without appending a protection parameter), the protection node 124 then authorizes the transaction and generates an exchange notification. Upon reaching the second DLT network 130, the exchange notification can be received by protection node 134. In some embodiments, protection node 134 can validate this incoming exchange notification. The validation process by protection node 134 can include a similar analysis, ensuring that the exchange notification aligns with the standards and requirements of the protection model within the second DLT network. Additionally, it is important to note that while the functionality of protection node 124 and protection node 134 has been distinctly outlined for clarity, these nodes are inherently capable of functioning in a vice-versa manner within their respective DLT. That is, under different configurations or requirements, protection node 134 could validate exchange records initially, while protection node 124 could validate exchange notifications subsequently.

In some embodiments, as shown, a digital asset 126 or 136 can be amended to include a protection parameters 128 and 138, respectively. For example, node 122d, representing a victim, may submit a content item as proof in a ransomware scenario. This content item is then validated by protection node 124 within DLT network 120. Upon validation, a consensus algorithm specific to DLT network 120 is employed to authorize the creation of a new block. This block incorporates the protection parameter 128, effectively flagging the transaction. Additionally, a pointer to the content item is appended, which could be added at the end of the block's hash or alternatively, as a metadata field within the block's structure. This pointer references the content item stored in an external ledger 140, accessible to both protection nodes of DLT networks 120 and 130. In this example and subsequently, node 132d, representing a hacker or ransomware perpetrator, is notified of this validated exchange. This notification can be provided by the protection node 134 of DLT network 130, which validates the exchange notification, and in turn, the DLT network 130 authorizes the exchange (e.g., using Proof of Work or Proof of Stake). The digital asset, initially digital asset 126 in DLT network 120 and now represented as digital asset 136 in DLT network 130, retains the protection parameter 138. This parameter is added to its corresponding block in DLT network 130, along with the same pointer to the external ledger 140.

When a digital asset, such as digital asset 126, is transferred from, for example, DLT network 120 to DLT network 130, its associated protection parameter, along with a pointer to an external content item, is consistently maintained across both networks. In some embodiments, the pointer can be integrated into the block's hash or stored as metadata within the block's header. If appended to the block's hash (e.g., added to the end), it can modify the hash value, creating a unique identifier that includes the reference to the external content. In the case of metadata storage, the pointer can be placed within the block's header but does not alter the hash value. Upon transfer, for example, to DLT network 130, the transaction, along with the embedded pointer, can be validated by protection node 134. The validation process includes recognizing and verifying the incoming protection parameter, which now includes the pointer from DLT network 120. The protection parameter, along with the pointer, is then integrated into the new block on DLT network 130. This integration is achieved either by modifying the hash of the new block (if the pointer is appended to the hash) or by including it in the block's metadata.

In some embodiments, the pointer, such as the alphanumeric string "14ch5841oiFp6", can be included in the hash of a block by concatenating it to the pre-hash data string. Specifically, before the block data is hashed through a blockchain's hashing algorithm, the pointer is added to the end of this data. This integration alters the resulting hash, embedding the pointer directly within it. For example, if the original block data produces a hash "abc123", with the pointer added, the new hash might be "abc12314ch5841oiFp6", where the pointer is now part of the hash. Alternatively, when including the pointer in the metadata, it can be added as a separate field in the block's header (e.g., ExternalPointer field), which contains various information about the block but doesn't affect the hash. In this case, the hexadecimal code "1a2b3c4d" would be inserted into a designated field within the block's header. For example, a block header might have a structure where one of the fields is labeled "ExternalPointer", and the hexadecimal code would be stored in this field.

Figure 1B:
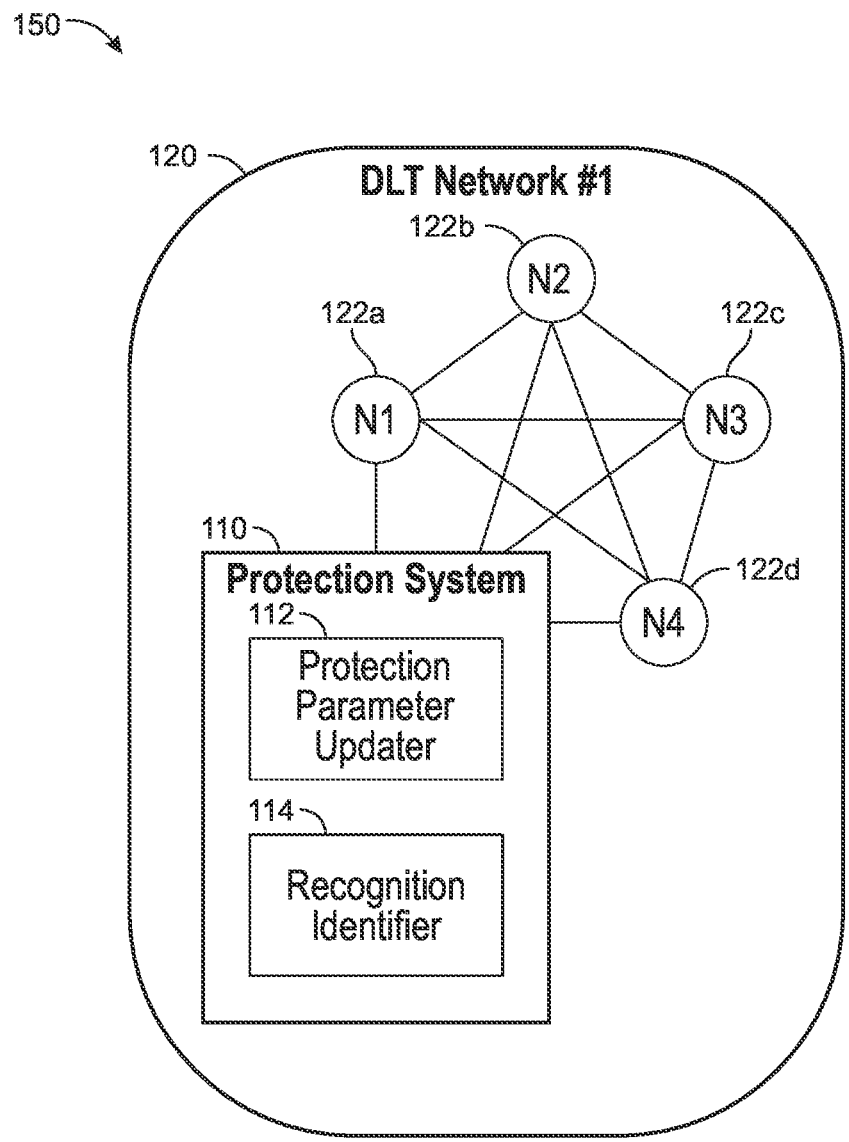
FIG. 1B is a block diagram depicting an example of another PoI architecture, according to some arrangements.

Referring now to FIG. 1B, a block diagram depicting an example of another PoI architecture 150, according to some arrangements. The PoI architecture 150 includes similar features and functionality as described above with reference to the PoI architecture 100 of FIG. 1A. However, as shown, the DLT network 120 can include the protection system 110 that can be substituted for the protection node and interconnected with the distributed ledger nodes to form a peer-to-peer network (e.g., DLT network 120). Indeed, since the protection system 110, including the protection parameter updater 112 and recognition identifier 114 is on the DLT network, the protection system 110 can operate within the ledger's infrastructure. Specifically, the protection system 110 can directly interact with the ledger's data flow, allowing for real-time updates and modifications to protection parameters based on ongoing transactions and network activities. For example, in the case of a suspicious transaction, the protection system 110 can intervene, applying the necessary protection parameters to safeguard the network's integrity. In some arrangements, the protection system 110 and nodes can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks). It should be understood that the protection system 110 can also be similarly added to DLT network 130.

Figure 2:
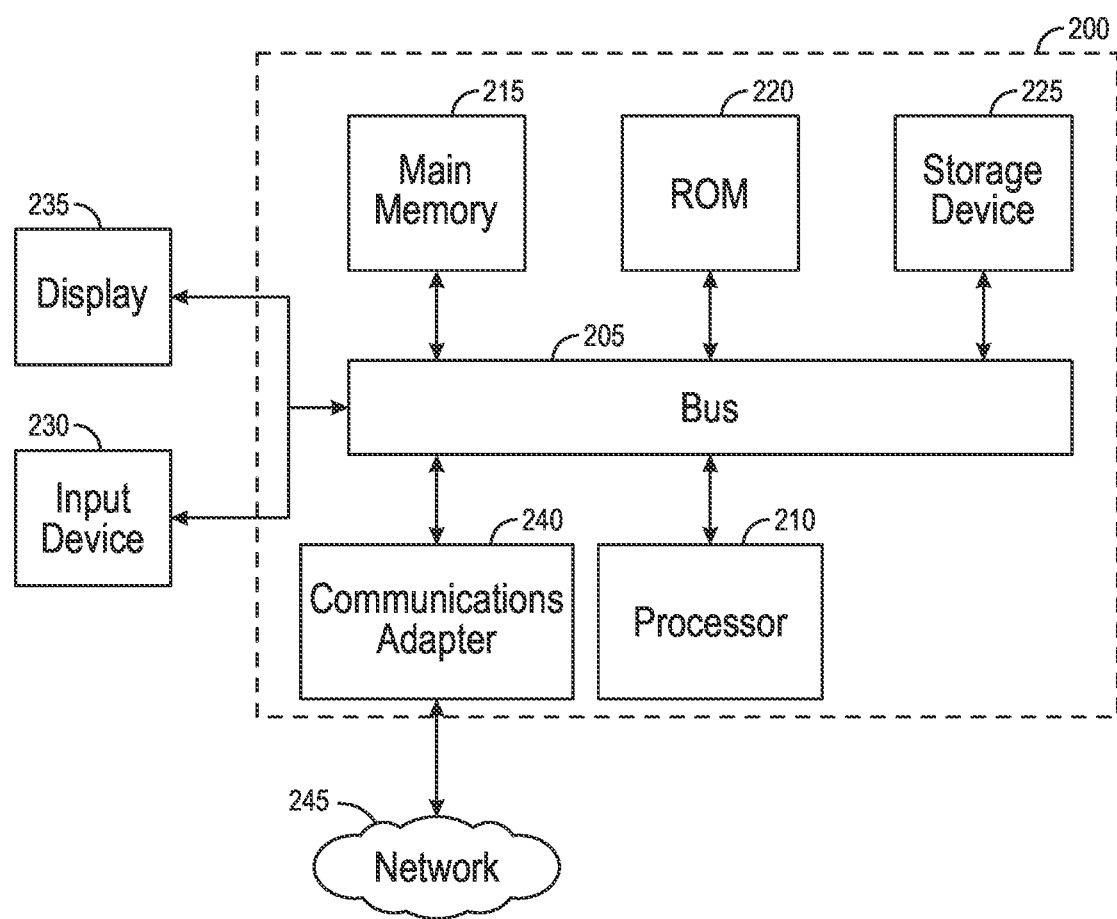
FIG. 2 is a block diagram illustrating an example computing system suitable for use in the various arrangements described herein.

Referring now to FIG. 2, a depiction of a computer system 200 is shown. The computer system 200 that can be used, for example, to implement a computing environment (e.g., PoI architecture 100), the protection system 110, the nodes of the DLT networks 120 and 130, and/or various other example systems described in the present disclosure. The computing system 200 includes a bus 205 or other communication component for communicating information and a processor 210 coupled to the bus 205 for processing information. The computing system 200 also includes main memory 215, such as a random-access memory (RAM) or other dynamic storage device, coupled to the bus 205 for storing information, and instructions to be executed by the processor 210.

Main memory 215 can also be used for storing position information, temporary variables, or other intermediate information during execution of instructions by the processor 210. The computing system 200 may further include a read only memory (ROM) 220 or other static storage device coupled to the bus 205 for storing static information and instructions for the processor 210. A storage device 225, such as a solid-state device, magnetic disk or optical disk, is coupled to the bus 205 for persistently storing information and instructions.

The computing system 200 may be coupled via the bus 205 to a display 235, such as a liquid crystal display, or active matrix display, for displaying information to a user. An input device 230, such as a keyboard including alphanumeric and other keys, may be coupled to the bus 205 for communicating information, and command selections to the processor 210. In another arrangement, the input device 230 has a touch screen display 235. The input device 230 can include any type of biometric sensor, a cursor control, such as a mouse, a trackball, or cursor direction keys, for communicating direction information and command selections to the processor 210 and for controlling cursor movement on the display 235.

In some arrangements, the computing system 200 may include a communications adapter 240, such as a networking adapter. Communications adapter 240 may be coupled to bus 205 and may be configured to enable communications with a computing or communications network 245 and/or other computing systems. In various illustrative arrangements, any type of networking configuration may be achieved using communications adapter 240, such as wired (e.g., via Ethernet), wireless (e.g., via Wi-Fi, Bluetooth), satellite (e.g., via GPS) pre-configured, ad-hoc, LAN, WAN.

According to various arrangements, the processes that effectuate illustrative arrangements that are described herein can be achieved by the computing system 200 in response to the processor 210 executing an arrangement of instructions contained in main memory 215. Such instructions can be read into main memory 215 from another computer-readable medium, such as the storage device 225. Execution of the arrangement of instructions contained in main memory 215 causes the computing system 200 to perform the illustrative processes described herein. One or more processors in a multi-processing arrangement may also be employed to execute the instructions contained in main memory 215. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 2, arrangements of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 2 as singular, stand-alone devices, one of ordinary skill in the art will appreciate that, in some arrangements, the computing system 200 may include virtualized systems and/or system resources. For example, in some arrangements, the computing system 200 may be a virtual switch, virtual router, virtual host, virtual server. In various arrangements, computing system 200 may share physical storage, hardware, and other resources with other virtual machines. In some arrangements, virtual resources of the network may include cloud computing resources such that a virtual resource may rely on distributed processing across more than one physical processor, distributed memory, etc.

Figure 3A:
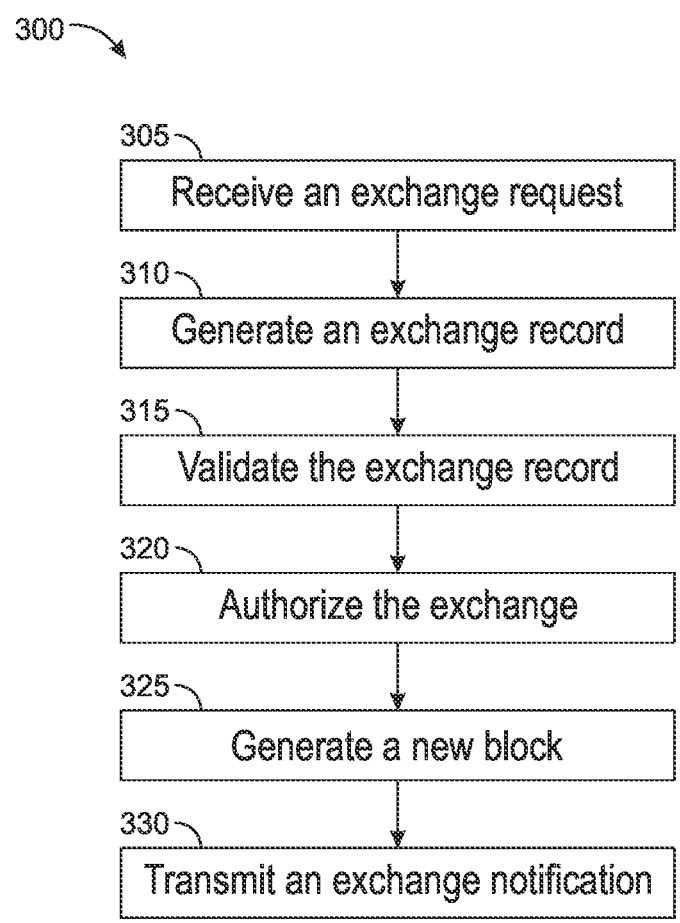
FIG. 3A is a flowchart for a method of restricting exchanges using a PoI model, according to some arrangements.
Figure 3B:
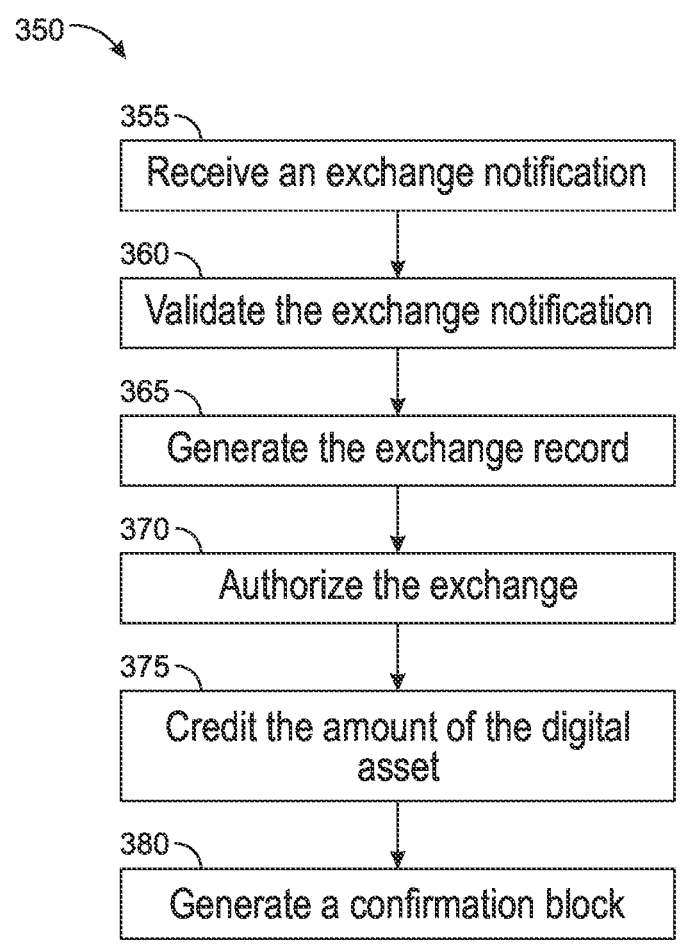
FIG. 3B is a flowchart for another method of restricting exchanges using a PoI model, according to some arrangements.

Referring generally to DLT network communications, validations, and authorizations of exchanges in FIGS. 3A-3B. In general, a protection system can be configured to generate and deploy protection code to a plurality of protection nodes of a plurality of DLT networks. The first DLT network can include a plurality of nodes, including at least one protection node. The first DLT network, operated by processing circuits, can, in response to receiving an exchange request from a node of the first plurality of nodes, generate an exchange record corresponding to an exchange of an amount of a digital asset, the exchange record includes at least a source identifier, a destination identifier, and the amount of the digital asset. Additionally, the first DLT network can validate, by the protection node, the exchange record in the amount of the digital asset based on a protection model corresponding to the protection code, wherein validating includes generating a protection parameter to append to the exchange record based on a content item. Furthermore, the first DLT network can authorize, based on a first consensus model, the exchange corresponding with the validated exchange record. Moreover, the first DLT network can generate a new blockchain block on the first DLT network, including the validated-authorized exchange record and the protection parameter and transmit, to a gateway interface of a second DLT network, an exchange notification including the validated-authorized exchange record.

For the second DLT network, it can include a plurality of nodes including at least one protection node. The second DLT network, operated by processing circuits, can receive the exchange notification from the gateway interface. Additionally, the second DLT network can validate, by the protection node, the exchange notification based on the protection model corresponding to the protection code. Furthermore, the second DLT network can authorize, based on a second consensus model, the exchange corresponding with the validated exchange notification. Moreover, the second DLT network can credit the amount of the digital asset to a recipient account on the second DLT network corresponding with the destination identifier and generate a confirmation blockchain block on the second DLT network, including the validated-authorized exchange notification and the protection parameter.

In some embodiments, the DLT networks can also communicate with an external ledger. The external ledger can be configured to store the content item and restrict access to a plurality of content items stored, the protection parameter including a pointer to the content item stored on the external ledger. In particular, the external ledger is accessible to the protection node of the first DLT network and the protection node of the second DLT network. Additionally, the external ledger can restrict access to other nodes of the plurality of nodes of the first DLT network and other nodes of the plurality of nodes of the second DLT network. In some embodiments, a use of the amount of the digital asset on the second DLT network is locked based on the protection parameter. Specifically, the use of the amount of the digital asset can be unlocked based on the second protection code receiving additional information corresponding with the exchange request.

Additionally, the transfer of a digital asset from a first DLT network to a second DLT network can include a combination of steps executed by processing circuits. In general, the steps can include, first, the processing circuits associated with the first DLT network can receive a transaction request from a node of a user; the transaction request can specify an amount of a digital asset (MBC) to be transferred to the second DLT network. Additionally, the transaction request can include sender and receipt addresses as well as a content item. Next, the processing circuits can verify the availability of the specified amount of MBC in the user's account on the first DLT network. Next, the processing circuits can initiate a locking mechanism on the first DLT network to temporarily secure the specified amount of MBC, thereby preventing its use in other transactions on the first DLT network. Next, the processing circuits can generate a transaction record corresponding to the transfer of the specified amount of MBC, the transaction record including at least a source identifier, a destination identifier, and the amount of MBC. Next, the processing circuits can submit the transaction record to a protection node on the first DLT network, the protection node being a specialized node tasked with verifying and endorsing transactions. Next, the processing circuits can validate and endorse, by the protection node on the first DLT network, the transaction record based on predefined criteria (e.g., protection model), including the authenticity of the transaction and adherence to the network's protocols. Additionally, the protection node can add protection parameters to the exchange record based on a protection model. Next, the processing circuits can communicate, by the protection node, the endorsed transaction record to the consensus mechanism of the first DLT network for authorization. Next, the processing circuits can create, upon authorization by the consensus mechanism, a new block on the first DLT network by the processing circuits, the new block including the endorsed and authorized transaction record and being added to the blockchain of the first DLT network. Additionally, in an example where a content item is provided in the exchange request, the processing circuits can append a pointer to the hash of the new block or into a metadata field of the new block. Lastly, on the first DLT network, the processing circuits can transmit a transfer notification, including details of the endorsed transaction record, to a gateway interface that facilitates communication between the first and second DLT networks.

On the second DLT network, processing circuits (e.g., of the nodes and/or protection node) can receive the transfer notification from the gateway interface. Next, the processing circuits can submit the transfer notification to a protection node on the second DLT network. Next, the processing circuits can validate and endorse, by the protection node on the second DLT network, the transfer notification based on the second network's predefined validation criteria (e.g., protection model). In some embodiments, the protection node can identify one or more protection parameters and one or more pointers to an external ledger. Next, the processing circuits can communicate, by the protection node, the endorsed transfer notification to the consensus mechanism of the second DLT network for authorization. Next, the processing circuits can credit, upon authorization by the consensus mechanism, the specified amount of MBC to a recipient's account on the second DLT network by the processing unit. In some embodiments, while the specified amount is credited, it may be unusable in a future exchange based on the protection parameter restricting its use until proof of integrity can be provided and approved. Next, the processing circuits can generate a confirmation block on the second DLT network, the confirmation block including a record of the credited amount of MBC and being added to the blockchain of the second DLT network, thereby completing the transfer of MBC from the first DLT network to the second DLT network.

Referring now to FIG. 3A, a flowchart for a method 300 of restricting exchanges using a PoI model is shown, according to some arrangements. The computing systems and nodes in FIG. 1A can be configured to perform method 300. Further, any computing device described herein can be configured to perform method 300.

In a broad overview of method 300, at block 305, the one or more processing circuits can receive an exchange request. At block 310, the one or more processing circuits can generate an exchange record. At block 315, the one or more processing circuits can validate the exchange request. At block 320, the one or more processing circuits can authorize the exchange. At block 325, the one or more processing circuits can generate a new block. At block 330, the one or more processing circuits can transmit an exchange notification. Additional, fewer, or different operations may be performed depending on the particular arrangement. In some arrangements, blocks can be optionally executed (e.g., blocks depicted as dotted lined) by the one or more processors. Additional, fewer, or different operations may be performed depending on the particular arrangement. In some embodiments, some or all operations of method 300 may be performed by one or more processors executing on one or more computing devices, systems, or servers. In various embodiments, each operation may be re-ordered, added, removed, or repeated.

Referring now to method 300 in greater detail, at block 305, the one or more processing circuits can receive, from a node on a first DLT network, an exchange request for an exchange, the exchange request includes an amount of a digital asset to exchange, a content item, and a destination identifier. In some embodiments, the content item includes multimedia data corresponding to the exchange. In some embodiments, when the processing circuits receive the exchange request from a node on the first DLT network, they are programmed to analyze the components of the request. Specifically, the processing circuits can decode the amount of the digital asset specified for the exchange, which could be expressed in various cryptocurrency denominations (e.g., Bitcoin, Ethereum). The multimedia data may include, for example, email correspondences, text documents, or image, audio, or video files. For example, in the context of a ransomware attack, the multimedia data included as the content item might consist of email exchanges between the victim and the attacker. These emails could contain specific ransom demands or communication regarding the terms of data release.

In some embodiments, the processing circuits can extract key information from these multimedia files (e.g., sender and recipient details, timestamps, and attached files). This data is then utilized in conjunction with the destination identifier, which specifies the intended recipient or destination of the digital asset within the network. The destination identifier could be a wallet address or another node identifier within the DLT network. In this process, the processing circuits ensure that all components of the exchange request, including the digital asset amount, content item, and destination identifier, are accurately parsed and validated in preparation for the subsequent stages of method 300. Additionally, the sender's public key can be included as part of the transaction data. The public key can act as a digital identifier, allowing other participants in the DLT network to verify the sender's identity and authenticate the transaction. Furthermore, the sender can use their private key to create a digital signature for the exchange request, which, while not transmitted, is used to prove the authenticity of the transaction.

At block 310, the one or more processing circuits can generate an exchange record corresponding to the exchange of the amount of the digital asset, the exchange record including at least a source identifier, the destination identifier, and the amount of the digital asset. In some embodiments, prior to generating the exchange record the processing circuits are further configured to verify an availability of the amount of the digital asset in a sender's account on the first DLT network and initiate a locking mechanism on the first DLT network to temporarily secure or debit the amount of the digital asset. In some embodiments, the processing circuits, upon receiving an exchange request, proceed to generate an exchange record. This record catalogs the details of the transaction, including, but not limited to, the source identifier (e.g., the sender's public key or wallet address), the destination identifier (e.g., the recipient's wallet address), and the amount of the digital asset involved in the exchange.

Specifically, before the creation of the exchange record, the processing circuits can verify the availability of the specified amount of the digital asset in the sender's account. This involves querying the first DLT network's ledger to confirm that the sender possesses sufficient funds or assets to complete the transaction. In scenarios where multiple types of digital assets might be involved (e.g., Bitcoin, Ethereum, or other altcoins), the processing circuits can adjust their verification process accordingly. Following this confirmation, the processing circuits can initiate a locking mechanism on the first DLT network. This mechanism can temporarily secure or debit the amount of the digital asset from the sender's account. For example, when the sender initiates a transaction to transfer a certain amount of Bitcoin, the processing circuits first confirm the availability of this amount in the sender's Bitcoin wallet. Upon successful verification, the processing circuits then activate a lock on the sender's wallet, temporarily debiting or freezing the specified amount. This lock remains in place until the transaction is either completed or cancelled.

At block 315, the one or more processing circuits can validate the exchange record in the amount of the digital asset based on a protection model, wherein validating includes generating a protection parameter to append to the exchange record based on the content item. In some embodiments, validating, based on the protection model, includes executing a dimensional analysis, using one or more smart contracts, of the content item and exchange information of the exchange request. Additionally, the protection parameter corresponds to a type of protection. The type of protection can correspond with at least one of a ransom protection, a fraud protection, a financial anomaly protection, a variance protection, or a fiscal compliance protection. Accordingly, the protection parameter can be appended to the exchange record by either (1) in response to receiving a content item and performing analysis of the item (e.g., to identify a ransom or some other cyber-attack), or (2) after performing a dimensional analysis of the exchange context (e.g., to identify a suspicious exchange). The dimensional analysis can identify exchanges for a high values/amounts, a particular location that may be suspicious, where the recipient regularly receives different sets of geolocations, and so on. Accordingly, the protection parameters can correspond with various flags, such as a ransom flag (e.g., from the content item and/or context of the exchange), global fraud detection flag, non-audacious flag, money laundering flag, tax evasion flag, etc.

Figure 5:
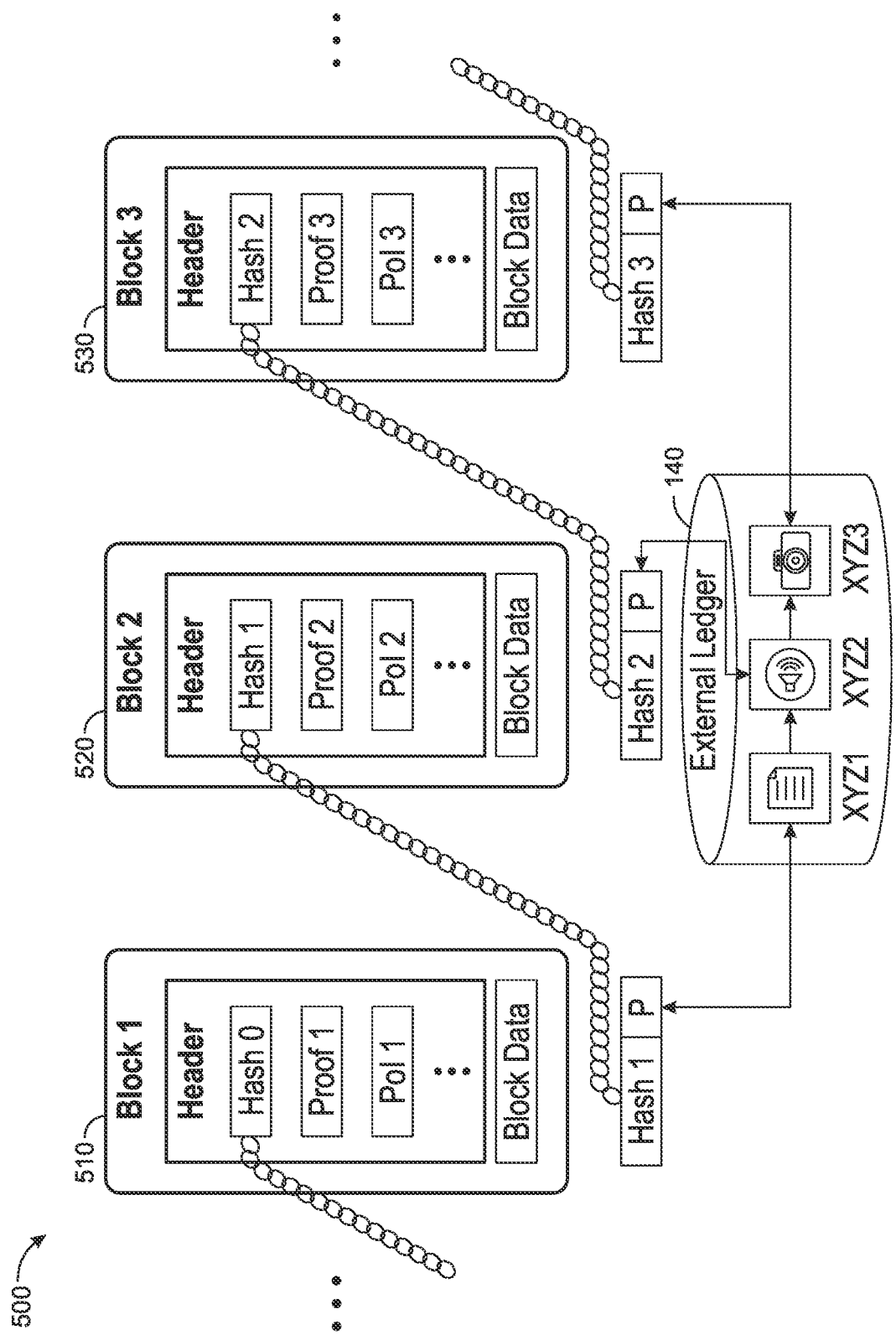
FIG. 5 is a block diagram illustrating PoI integration into a blockchain, according to some arrangements.

In some embodiments, the protection parameter corresponds to executable code added to the exchange on the plurality of DLT networks by the processing circuits to restrict or authorize a future exchange. In some embodiments, the one or more smart contracts can enforce one or more integrity conditions of the protection parameter on the second DLT network (i.e., restrict a use until proof of integrity is confirmed). With reference to FIG. 5, a new blockchain block can be created on the first DLT network with one or more smart contracts deployed in the header (e.g., "proof of integrity (PoI) 1" block in Block 510 of FIG. 5) of the block encoded with the protection parameters. Generally, the header acts as a summary and includes essential information about the block's contents, including these smart contracts. For example, in the "proof of integrity (PoI) 1" block, as shown in Block 510 of FIG. 5, the header is encoded with the protection parameters.

In some embodiments, the at least one processing circuit is further configured to receive, from a protection system, protection code for executing the protection model. In some embodiments, validating is performed by a protection node among a plurality of nodes in the first DLT network. Additionally, validating further includes storing the content item on an external ledger, and the protection parameter including a pointer to the content item stored on the external ledger. In some embodiments, the external ledger is accessible to the protection node of the first DLT network and a protection node of a plurality of nodes of the second DLT network. In some embodiments, the external ledger is inaccessible to other nodes of the plurality of nodes of the first DLT network and other nodes of the plurality of nodes of the second DLT network.

In some embodiments, the validation process conducted by the processing circuits against the protection model can include an examination of the exchange record, focusing on both the content item and the exchange context. This can include a dimensional analysis, using one or more smart contracts, to scrutinize the content item, such as emails in a ransomware case, and other exchange details like transaction frequency or amount. The analysis can detect anomalies or patterns indicative of various financial threats like fraud or money laundering. In some embodiments, the protection parameter is accompanied by a separate mechanism that establishes a link to the content item stored on an external ledger. While the protection parameter itself does not include a pointer, this associated mechanism functions to provide a reference to the content item. The external ledger, containing the content item, is accessible to the protection nodes of both the first and second DLT networks. In some embodiments, for security and confidentiality reasons, this ledger is designed to be inaccessible to the other nodes within these networks.

Specifically, the generation of the protection parameter is a direct result of the validation process, where this parameter serves as executable code added to the transaction on the DLT networks by the processing circuits. This code dynamically represents the type of protection required for the transaction. For example, if the content item and exchange information indicate a ransomware attack, the processing circuits generate a ransom protection parameter as executable code, which is then integrated into the exchange record. In cases of suspicious financial activities, similar executable codes representing fraud protection or fiscal compliance protection are generated. This executable protection parameter, in essence, functions as a flag within the smart contracts deployed in the header of the new blockchain block, indicating the nature of the threat or irregularity detected during the validation. For example, a dimensional analysis of the exchange record might reveal a transaction with unusually high values or occurring in suspicious geolocations, prompting the processing circuits to generate executable codes for global fraud detection or money laundering flags as the protection parameter. These parameters are then embedded into the exchange record, tagging the transaction for additional scrutiny and enforcing a requirement for proof of integrity at a future point in the transaction lifecycle, such as when the recipient attempts to use or exchange the asset on the second DLT network.

At block 320, the one or more processing circuits can authorize, based on a consensus model, the exchange corresponding with the validated exchange record, including the appended protection parameter. At block 325, the one or more processing circuits can generate a new blockchain block on the first DLT network, including the validated-authorized exchange record. In some embodiments, the processing circuits, after validating the exchange record and appending the protection parameter, proceed to authorize the exchange based on the network's consensus model. The consensus model, which may vary between Proof of Work, Proof of Stake, or other mechanisms, is applied to ensure that the transaction is agreed upon by a majority of the network's nodes. This consensus is achieved despite the presence of the protection parameter, which does not hinder but rather conditions the transaction's approval in a subsequent exchange. Specifically, the generation of a new blockchain block on the first DLT network by the processing circuits includes incorporating the validated and authorized exchange record, complete with the appended protection parameter. For example, in an example where the transaction is later identified as fraudulent, the processing circuits can activate the protection parameter embedded within the block. This activation may trigger specific smart contracts or conditions that restrict or monitor the subsequent movement of the digital assets involved. Essentially, the protection parameter serves as a mechanism to quarantine the digital asset within the network, preventing its unauthorized use or transfer. In this improved architectural approach, the processing circuits enable transactions to proceed with conditional approval, marked by the protection parameter. It allows for the usual flow of transactions while embedding a layer of security that can be activated as needed.

At block 330, the one or more processing circuits can transmit, to a gateway interface of a second DLT network, an exchange notification including the validated-authorized exchange record. In some embodiments, the validated-authorized exchange record is transmitted via the gateway interface to a protection node of a plurality of nodes of the second DLT network. Specifically, the protection node of the second DLT network includes the protection code for executing the protection model. In some embodiments, a use of the amount of the digital asset on the second DLT network is locked based on the protection parameter, wherein the protection model is a proof of integrity algorithm.

In some embodiments, the transmission of the validated and authorized exchange record can occur through a designated gateway interface, which acts as a bridge between the first and second DLT networks. The gateway interface is configured to ensure communication between disparate blockchain networks. The exchange notification, including the exchange record with the appended protection parameter, is sent to this gateway. Specifically, upon reaching the second DLT network, the exchange notification is directed to a specialized protection node among the plurality of nodes within this network. This protection node is equipped with protection code to execute the protection model, which includes the proof of integrity algorithm. In some embodiments, the protection node assesses the incoming exchange record in light of the protection parameter. If the protection parameter indicates a lock on the use of the digital asset, as per the defined conditions, the protection node will enforce this restriction on future exchanges, still allowing the current exchange to process. Specifically, this might involve temporarily freezing the asset or placing specific conditions on its future use within the second DLT network. The proof of integrity algorithm executed by the protection node ensures that any transaction flagged by the protection parameter adheres to the stringent security and integrity standards set by the DLT network before the asset is unlocked or used.

In some embodiments, the processing circuits can be further configured to communicably couple the node (i.e., that initiated the exchange) of the first DLT network to the protection node of the second DLT network. In response to receiving a confirmation from the node corresponding with the protection parameter (e.g., the hacked computer was unlocked, the data held ransom was unencrypted), request a retrieval of the amount of the digital asset, wherein the confirmation includes an indication the node received a return action based on the exchange. For example, in a ransomware attack, typically the hacked computer systems or data will not be "unlocked" without the transfer of funds. Thus, a confirmation can be provided from the node when the transaction occurs with the recipient and the sender receives, in exchange, an unlocked computer system or data in return. In some embodiments, the processing circuits can receive a new exchange notification that includes a return exchange record corresponding with the amount of the digital asset (e.g., claw back the funds). Additionally, the processing circuits can credit the amount of the digital asset to a sender account on the first DLT network corresponding with the source identifier.

In some embodiments, the processing circuits are designed to establish a communicative link between the node that initiated the exchange on the first DLT network and the protection node of the second DLT network. This coupling can facilitate a feedback loop regarding the outcome of the transaction, particularly in scenarios where the exchange is contingent on a specific return action, such as in ransomware cases. The communication process might involve protocol interfaces (e.g., REST APIs, WebSocket connections) that enable real-time or near-real-time data exchange between nodes across different networks. When a confirmation is received from the initiating node, indicating that the expected return action (e.g., unlocking of a hacked computer system, decryption of held data) has been fulfilled, the processing circuits then proceed to manage the retrieval of the digital asset. Specifically, in the ransomware attack scenario, upon receiving confirmation that the victim's computer system or data has been unlocked, the processing circuits receive a new exchange notification. This notification includes a return exchange record, signaling the commencement of a process to potentially "claw back" the funds. In such a situation, the processing circuits can credit the amount of the digital asset back to the sender's account on the first DLT network, as per the source identifier. Furthermore, the protection node of the second DLT network implements a You-Owe-Me (YOM) construct. This approach is a deviation from the traditional I-Owe-You (IOY) construct typical in blockchain transactions. The YOM construct is particularly effective in scenarios where transactions are conditional or have the potential to be reversed, providing a structured mechanism to ensure that obligations are met and assets are returned or retained based on the outcome of the transaction's conditions.

Under the You-Owe-Me (YOM) construct in a ransomware scenario, the mechanism is designed to claw back funds transferred to the attacker's wallet after the victim's system has been unlocked. Once the digital asset is transferred to the ransomware attacker's wallet on the second DLT network, the YOM construct remains in a conditional state. This state is monitored by the smart contract associated with the transaction. Upon verification that the victim's system has been unlocked, which is typically reported back to the protection node of the second DLT network (e.g., via the protection node of the first DLT network or directly with the protection node of the second DLT network), the YOM construct activates a reversal clause. This clause is pre-encoded in the smart contract and is contingent on the fulfillment of the attacker's obligation (i.e., unlocking the victim's system). Once this condition is confirmed, the smart contract triggers an automated process to withdraw or 'claw back' the funds from the attacker's wallet and reroute them back to the victim's account. Specifically, the YOM construct in this context serves as a safeguard, ensuring that while the attacker may temporarily receive the funds as part of the ransom payment, they are subsequently retracted once the attacker fulfills their end of the bargain. This construct effectively disincentivizes malicious activities by undermining the attacker's ability to profit from such actions, thereby adding a layer of security to transactions in situations where trust is compromised.

Referring now to FIG. 3B, a flowchart for another method 350 of restricting exchanges using a PoI model is shown, according to some arrangements. The computing systems and nodes of FIG. 1 can be configured to perform method 350. Further, any computing device described herein can be configured to perform method 350.

In a broad overview of method 350, at block 355, the one or more processing circuits can receive an exchange notification. At block 360, the one or more processing circuits can validate the exchange notification. At block 365, the one or more processing circuits can generate the exchange record. At block 370, the one or more processing circuits can authorize the exchange. At block 375, the one or more processing circuits can credit the amount of the digital asset. At block 380, the one or more processing circuits can generate a confirmation block. Additional, fewer, or different operations may be performed depending on the particular arrangement. In some arrangements, blocks can be optionally executed (e.g., blocks depicted as dotted lined) by the one or more processors. Additional, fewer, or different operations may be performed depending on the particular arrangement. In some embodiments, some or all operations of method 300 may be performed by one or more processors executing on one or more computing devices, systems, or servers. In various embodiments, each operation may be re-ordered, added, removed, or repeated.

In general, method 350 includes similar features and functionality as described above with reference to method 300. However, instead of generating and appending (or adding) a protection parameter (i.e., flag or indicator) prior to sending the exchange to the attacker's node on a second DLT network, method 350 is directed to performing an exchange between DLT networks, where the first DLT network does not add or append a protection parameter. Specifically, the second DLT network can perform a multi-dimensional analysis to further secure exchanges between DLT networks as well as reduce cyber-attackers from exploiting blockchain technology to funnel or hide funds. For clarity and simplicity in the context of method 350, the first DLT network and first protection node are designated as the network that receives the exchange, typically representing the platform where the cyber-attacker's node is located. Conversely, the second DLT network and second protection node are identified as the ones that provide funds or digital assets, generally corresponding to the network where the victim's node resides.

Referring now to method 350 in greater detail, at block 355, the one or more processing circuits can receive, by a first protection node on a first DLT network, an exchange notification from a second DLT network corresponding with an exchange, the exchange notification validated by a second protection node on the second DLT network. In some embodiments, the exchange notification is received via a gateway interface. The second protection node of the second DLT network includes protection code for executing the protection model, and wherein the use of the amount of the digital asset on the first DLT network is locked based on the protection parameter.

In some embodiments, upon the initiation of an exchange between DLT networks in method 350, the first protection node on the first DLT network is configured to receive an exchange notification. This notification, which originates from the second DLT network, encapsulates details of the proposed exchange validated by the second protection node. The reception of this notification via the gateway interface indicates to the first DLT network that a transaction has been proposed and passed preliminary checks on the second network, where the victim's node resides. Specifically, the exchange notification received by the first protection node carries data such as the amount of digital asset to be exchanged, the sender and receiver identifiers, and the validation status. The validation by the second protection node includes ensuring that the digital asset is available and that the transaction does not violate any of the integrity conditions set by the protection model. Upon receipt of this notification, the first protection node can perform its due diligence. For example, if the exchange notification indicates that a certain amount of digital asset is to be transferred from the victim's node on the second DLT network to the attacker's node on the first DLT network, the first protection node can assess this information. In some embodiments, the processing circuits within the first protection node can proceed to lock the usage of the digital asset on the first DLT network, as stipulated by a protection parameter (e.g., in blocks 360-365).

At block 360, the one or more processing circuits can validate, by the first protection node, the exchange notification based on a protection model corresponding to the protection code, wherein validating includes generating a protection parameter for appending to an exchange record based on a dimensional analysis of the exchange notification. In some embodiments, the dimensional analysis includes executing one or more smart contracts based on receiving the exchange notification. The processing circuits can also receive, from a protection system, the protection code for executing the protection model. In some embodiments, the protection parameter corresponds to a type of protection. For example, the type of protection corresponds with at least one of a ransom protection, a fraud protection, a financial anomaly protection, a variance protection, or a fiscal compliance protection.

In some embodiments, the validation of the exchange notification by the first protection node is conducted through a series of executions. The processing circuits can utilize the protection code to perform a dimensional analysis of the transaction data contained in the notification. This analysis can utilize one or more smart contracts to verify various transaction elements, such as value, frequency, and sender-recipient relationship against established security parameters within the protection model. Specifically, the dimensional analysis executed by the smart contracts is a multi-faceted evaluation that extends beyond the surface details of the transaction. It includes parsing the data to identify patterns or anomalies that could indicate a security threat, such as ransom demands or signs of financial fraud.

The processing circuits, following the directives of the smart contracts, then generate the appropriate protection parameter that corresponds to the identified risk, such as a flag for ransom protection or fraud protection. For example, a transaction that suddenly demands a large volume of digital assets, which is inconsistent with the historical pattern of the sender's account, triggers the generation of a financial anomaly protection parameter. This parameter is then appended to the exchange record at block 365, indicating that the transaction may require additional scrutiny (i.e., proof of integrity). The smart contracts are configured to detect a range of predefined conditions and, upon their detection, initiate the creation of a protection parameter that is specific to the type of anomaly identified. The processing circuits, moreover, are configured to receive updates to the protection code. The protection parameter, reflective of the threat level and type, is derived from the detailed analysis performed by the smart contracts and is embedded within the transaction record to guide the subsequent handling of the exchange within the DLT network.

In one example, the processing circuits of the first DLT network receive an exchange notification from the second DLT network that does not include a protection parameter or a content item appended to the exchange request. Upon conducting a multi-dimensional analysis, the processing circuits may identify patterns consistent with money laundering, such as the rapid movement of large sums of digital assets through multiple accounts or jurisdictions known for relaxed regulation. In this example, the processing circuits utilize the transaction's metadata, frequency, and volume to flag the exchange as high-risk, potentially triggering an automated response to validate and authorize the transaction of the digital asset, but limiting the use until proof of integrity can be provided. In another example, the processing circuits might detect a transaction pattern that aligns with tax evasion techniques during the multi-dimensional analysis of an exchange notification. This could include identifying transactions that strategically fall below reporting thresholds or are directed to or from entities in jurisdictions with favorable tax laws. Here, the absence of a content item or protection parameter in the exchange notification does not hinder the processing circuits from analyzing the transaction's structure and flow to identify potential tax evasion strategies. Consequently, the processing circuits could initiate a series of actions, such as flagging the transaction with a protection parameter, validating and authorizing the transaction, and further limiting the use of the digital asset until proof of integrity can be provided.

At block 365, the one or more processing circuits can generate the exchange record corresponding to the exchange of an amount of a digital asset, the exchange record including at least a source identifier, a destination identifier, the amount of the digital asset, and the protection parameter appended. At block 370, the one or more processing circuits can authorize, based on a consensus model, the exchange corresponding with the exchange record, including the protection parameter appended. At block 375, the one or more processing circuits can credit the amount of the digital asset to a recipient account on the first DLT network corresponding with the destination identifier. At block 380, the one or more processing circuits can generate a confirmation blockchain block on the first DLT network including the exchange record with the protection parameter appended. Specifically, the exchange can be authorized (and validated by the protection nodes) even though a protection parameter (e.g., for tax evasion, money laundering, etc.) can be appended to the blockchain block (e.g., in the header). Thus, unlike existing fraud or protection systems that would have denied or rejected the exchange on either the originating DLT network or the first DLT network, the processing circuits described herein can instead authorize the transaction with conditional oversight. This means that while the transaction proceeds, it is tagged with the protection parameter for subsequent monitoring and potential intervention.

In some embodiments, upon generating the exchange record at block 365, the processing circuits of the first DLT network proceed to embed specific identifiers and transaction amounts within the record. This includes assigning unique source and destination identifiers that correlate to the respective digital wallets or accounts involved in the exchange. The amount of the digital asset being transferred is also recorded. In some embodiments, at block 370, the authorization of the exchange is executed based on the consensus model adopted by the first DLT network, which could be Proof of Work, Proof of Stake, or any other established mechanism. The consensus model ensures that the transaction is validated by multiple nodes within the network, reflecting a collective agreement before the exchange is finalized. This validation occurs even if a protection parameter, indicative of potential financial malfeasance such as money laundering or tax evasion, has been appended to the exchange record.

After the protection parameter is generated by the notary node, also known as the protection node, the processing circuits can append this parameter to the exchange record. The appending process can include the integration of the protection parameter into the existing structure of the exchange record. This can achieved by modifying the record's data fields to include the protection parameter, which could include adding a new field or embedding the parameter within existing fields. In some embodiments, the exchange record and the protection parameter can encompass a data structure passed to the DLT network for authorization (e.g., using PoW or PoS, at block 370). Thus, once appended, the exchange record and/or data structure can now contain the protection parameter. This appended record is then used in subsequent steps, including authorization at block 370, crediting of funds at block 375, and the generation of a confirmation blockchain block at block 380.

Additionally, at block 375, once the exchange is authorized, the processing circuits credit the amount of the digital asset to the recipient's account associated with the destination identifier on the first DLT network. This crediting represents the successful completion of the consensus process and signifies that the transaction has met all required conditions set forth by the network's protocols, despite the appended protection parameter. For example, at block 380, a confirmation blockchain block is generated by the processing circuits on the first DLT network. This block includes the exchange record along with the appended protection parameter. This parameter, which could signify a risk of money laundering or tax evasion (or some other flag) detected during the transaction's analysis, is embedded within the header of the blockchain block. The incorporation of this parameter into the block's header allows the transaction to proceed while still flagging it for monitoring or future action. Thus, instead of outright rejection, the processing circuits described herein facilitate the continuation of the exchange with added oversight, allowing for post-transactional analysis and intervention if necessary (e.g., restricting a future exchange until proof of integrity can be provided).

After the protection parameter is appended to the exchange record, the processing circuits at block 380 incorporate this protection parameter into the structure of the new blockchain block being created. This incorporation can occur in two primary ways: either by adding the protection parameter to the header of the new block or by including it as part of the block's metadata. In some embodiments, if the parameter is added to the block header. Alternatively, in some embodiments, if the protection parameter is included as metadata, it is embedded within the block in a way that does not alter the core structure of the block but is still retrievable and recognizable for validation and auditing purposes. In either case, the exchange record itself, including details like the source identifier, destination identifier, and the amount of the digital asset, may or may not include the protection parameter directly. In some embodiments, the generation of the new confirmation block can occur prior to block 375.

In some embodiments, the processing circuits can receive, from a node on the first DLT network, an exchange request for a subsequent exchange of at least a portion of the amount of the digital asset. Additionally, the processing circuits prohibit the subsequent exchange based on the protection parameter on the confirmation blockchain block. In some embodiments, prohibiting the subsequent exchange is based at least on the protection model executing a proof of integrity algorithm encoded into the protection code executed by the first protection node. In some embodiments, the processing circuits are configured to receive requests for subsequent exchanges of the digital asset from a node on the first DLT network. These requests could pertain to a partial or full amount of the digital asset originally involved in the transaction. Upon receipt of such a request, the processing circuits can perform a verification process, referencing the protection parameter detailed on the confirmation blockchain block to determine the permissibility of the subsequent exchange.

Specifically, the authorization or prohibition of the subsequent exchange by the processing circuits is based on the protection parameter encoded within a smart contract. If the protection model, executed by the processing circuits and which operates on a proof of integrity algorithm, determines a prohibition due to detected anomalies or risks flagged during the initial exchange, the processing circuits enforce this decision. This enforcement may include the suspension of transaction capabilities or the freezing of assets within the node's digital wallet, as dictated by the algorithm's output. For example, if the protection parameter is associated with a risk indicator for money laundering, the processing circuits will prevent any further transactions involving the implicated digital assets. This preventive action is automated, triggered by the protection model's conditions that have been encoded into the protection code of the first protection node. The code itself is designed to execute a series of logical checks against the parameters set by the protection model, which includes scrutinizing transaction patterns, recipient authenticity, and asset provenance. Furthermore, in some embodiments, the processing circuits maintain a log of all exchange requests and the resulting actions taken based on the protection parameter.

In some embodiments, the locked digital asset can be unlocked or made available for subsequent exchange upon the provision of proof of integrity by the user. This proof may take various forms, depending on the context of the transaction and the requirements of the protection model. For example, the user might submit a verifiable receipt of goods or services for which the digital asset was exchanged, a notarized document affirming the legitimacy of the transaction, or even a time-stamped video confirmation of a physical exchange. In more complex examples, such as international trade, the proof could include customs clearance certificates or letters of credit. Each form of proof is subject to validation by the processing circuits, which then determine whether the integrity of the transaction meets the thresholds established by the protection model, thus authorizing the release of the funds.

In some embodiments, the processing circuits facilitate the unlocking of a restricted digital asset by initially receiving a request for exchange from the user. This request is assessed against the existing protection parameter; if the parameter enforces a restriction, the transaction is halted, and the user is notified of the requirement to provide proof of integrity. Upon submission of the proof by the user, the processing circuits analyze its validity and, if deemed satisfactory, proceed to unlock the asset. This unlocking can be executed by either removing the restrictive flag from the asset's record or by overriding the existing parameter. Subsequently, a new block is created for the transaction on the blockchain, which does not include the prior protection parameter, thereby enabling the exchange to proceed unimpeded.

In some embodiments, the processing circuits can also communicably couple the first protection node of the first DLT network to a node of the second DLT network. Additionally, a retrieval request can be received for the amount of the digital asset. The retrieval request can include a confirmation indicating the node of the second DLT network received a return action based on the exchange. In some embodiments, the processing circuits can generate a reversal exchange record corresponding to a reversal exchange of the amount of the digital asset, a reversal record including at least the source identifier, the destination identifier, and the amount of the digital asset. Specifically, prior to generating the reversal exchange record the processing circuits can initiate a locking mechanism on the first DLT network to temporarily secure or debit the amount of the digital asset. In some embodiments, the processing circuits can also authorize, based on the consensus model, the reversal exchange corresponding with the reversal exchange record and generate a new blockchain block on the first DLT network including the reversal exchange record. Additionally, the processing circuits can transmit, to a gateway interface of the second DLT network, a reversal exchange notification including the reversal exchange record.

In some embodiments, the processing circuits enable communication between the first protection node of the first DLT network and a node on the second DLT network. For example, when a victim makes a ransom payment, the processing circuits can receive a retrieval request from the victim's node (on the second DLT network) after the victim's system has been unlocked by the attacker. This retrieval request can include confirmation of the return action, specifically indicating that the system has been unlocked, and it initiates the process for reversing the transaction. Upon receiving this retrieval request, the processing circuits on the first DLT network, where the ransom payment was initially received, can generate a reversal exchange record. This record can reflect the intent to reverse the initial transaction, following the unlocking of the victim's system. The reversal record can include information (metadata) such as the source identifier (the attacker's node), the destination identifier (the victim's node), and the amount of digital asset involved. Prior to finalizing the reversal record, the processing circuits can initiate a locking mechanism on the first DLT network. This can mechanism temporarily secures the digital asset, ensuring it is set aside for the reversal transaction. Once the reversal is authorized, adhering to the consensus model of the first DLT network, a new blockchain block is generated containing the reversal exchange record. Additionally, the processing circuits transmit a reversal exchange notification to the second DLT network, communicating the initiation of the transaction reversal process, allowing the victim to recover the digital asset paid as ransom.

Figure 4A:
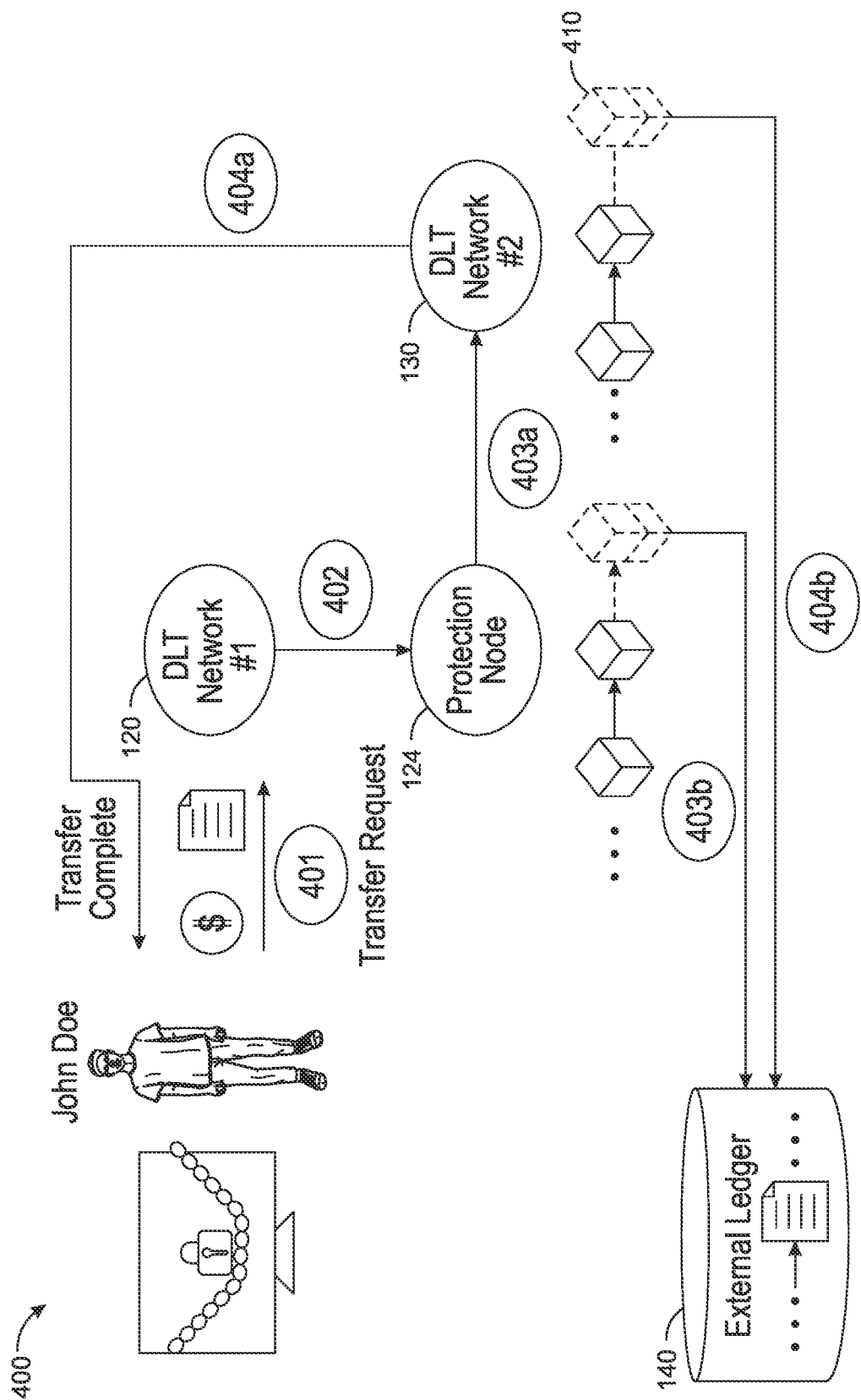
FIG. 4A is a block diagram illustrating a PoI process, according to some arrangements.

Referring now to FIG. 4A, a block diagram illustrating a PoI process 400, according to some arrangements. Additionally, details regarding PoI process 400 are described in detail with reference to method 300 of FIG. 3A. Referring to exchanging funds from one DLT network to another DLT network in greater detail, at step 401, an exchange begins with the processing circuits associated with the first DLT network receiving a transfer request (or exchange) from a user (e.g., user with a locked computer based on a ransomware attack, user attempting to launder money or avoid taxes, and so on). This request specifies an amount of a digital asset (MBC) to be exchanged to the second DLT network (e.g., attackers node). In some embodiments, the request can include a content item, such as a document or multimedia file recording evidence of the ransom or hack. In some embodiments, the content item may not be attached to the request, for example, when the user is attempting to launder money (e.g., performing multi-hop laundering, transferring between accounts to attempt to hide from taxing authorities). DLT network 120 can generate an exchange record corresponding to the exchange and at step 402 provide the exchange record to the protection node 124. Protection node 124 can validate the exchange record and generate a protection parameter to append to the exchange record if a content item was received.

At step 403a and 403b, the processing circuits of DLT network 120 and/or the protection node 124 can authorize the exchange based on a consensus mechanism, generate a new blockchain block (step 404b) and transmit an exchange notification (step 403a). In some embodiments, and as shown, the new blockchain block can include the validated and authorized exchange record along with the protection parameter and a pointer an external ledger. As described herein, the protection parameter can be added to the header of the new block or as metadata (i.e., additional data, shown as an additional block below the new blockchain block). However, it should be understood that while the additional data is shown as a block under the new blockchain block, it is depicted as such for ease of understanding and that the new blockchain block encapsulates this additional data within its structure (or address, e.g., added to the hash of the block). In some embodiments, the pointer can be additional data indicative of a pointer to an external ledger 140 with the content item if it was provided by the user. For example, the protection node 124 can store the content item in an external ledger 140 that is accessible to protection nodes of the DLT networks. In some embodiments, the content item pointer could be added to the metadata or hash of the new blockchain block. At step 404a and 404b, the processing circuits of DLT network 120 and/or the protection node (e.g., protection node 134) complete the exchange and a new blockchain block 410 can also be added. As shown, new blockchain block 410 on DLT network 130 can also include the additional data (e.g., the protection parameters and the pointer to the content item on external ledger 140, if a content item was provided by the user that initiated the exchange). In some embodiments, the protection node of DLT network 130 can encapsulate the additional data within the exchange. At step 404a, a transfer complete can be transmitted back to the user or node of the user indicating the exchange is complete.

In some embodiments, the DLT networks or protection nodes can create a content item based on specific triggers or conditions identified during the transaction process. For example, if the user's exchange request lacks a content item, particularly in scenarios suggestive of money laundering or tax evasion, the protection node may generate a content item that encapsulates transactional evidence or anomalous patterns detected. This generated content item could include a detailed transaction analysis report, patterns of fund movement across accounts, or flagged activities that deviate from normal transactional behavior. The content item is then stored in the external ledger 140 accessible to the protection nodes and linked via a pointer within the new blockchain block.

Figure 4B:
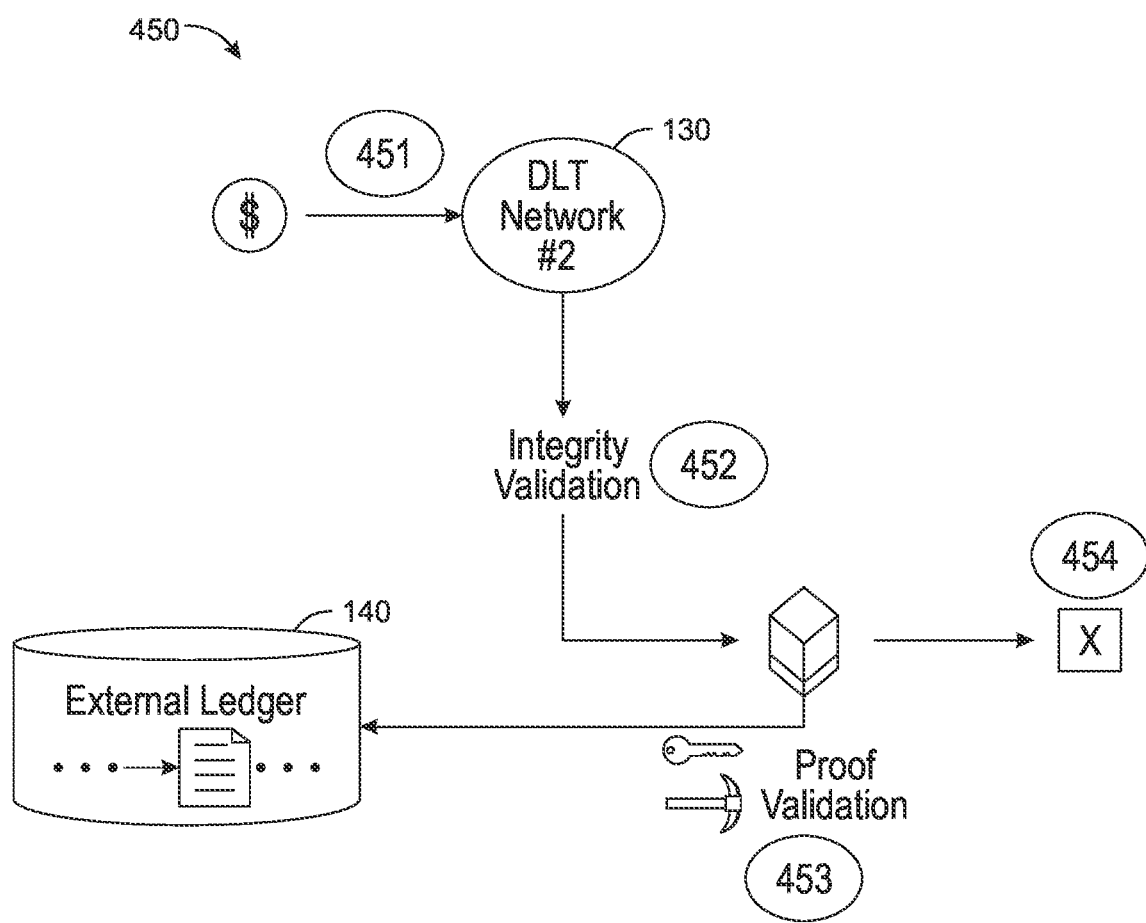
FIG. 4B is another block diagram illustrating a PoI process, according to some arrangements.

Referring now to FIG. 4B, a block diagram illustrating a PoI process 450, according to some arrangements. Additionally, details regarding PoI process 450 are described in detail with reference to method 450 of FIG. 3B. Referring to exchanging funds from one DLT network to another DLT network in greater detail, at step 451, an exchange begins with the processing circuits associated with the DLT network 451 receiving a transfer notification (e.g., from a different DLT network). In some embodiments, the transfer may not be flagged by the other DLT network. Specifically, a protection parameter or pointer to a content item may not have been encapsulated in the block creation and exchange notification. At step 452, the DLT network 130 can perform an integrity validation based on performing a multi-dimensional analysis using protection code of a protection model (e.g., proof of integrity (PoI) model). Here, the protection node of DLT network 130 can generate a protection parameter for appending to an exchange record. In some embodiments, a content item can be generated and/or added with a pointer to the external ledger 140. Next, the exchange record can be generated with various information (e.g., source identifier, destination identifier, an amount of digital asset being exchange) and including the protection parameter. At step 453, the DLT network 130 can authorize the exchange corresponding with the exchange record and protection parameter, credit the amount of a digital asset to an account of the recipient (e.g., digital wallet), and generate a confirmation blockchain block. As shown, a pointer can be added to the hash (e.g., end of the hash) or metadata field of the new block, pointing to an external ledger 140. However, in some embodiments, the new confirmation block created may not contain a pointer. Nonetheless, once the account of the recipient (e.g., digital wallet associated with the destination identifier) new confirmation block is generated, at step 454, the funds may be locked or restricted from use until a proof of integrity (PoI) can be provided. Thus, the digital assets can be frozen until the recipient can provide a content item or some other proof that the funds are legitimate (e.g., receipt, order summary, signed affidavits, court order, etc.) and/or that the flag (protection parameter) is invalid or inappropriate.

Referring to FIGS. 4A-4B generally, the protection parameter can protect exchanges, particularly in scenarios like ransomware attacks or financial crimes such as money laundering or tax evasion. Whether generated based on multi-dimensional analysis by either the first or second DLT network, or derived from a provided content item, the protection parameter acts to sequester or neutralize the digital assets involved in the transaction. This mechanism is designed to address the technical problem where immediate processing of a transaction is necessary—for example, to unlock a victim's systems in a ransomware attack—but where there is also a need to maintain control over the funds to prevent their misuse. In the case of a ransomware payment, for example, the processing circuits allows the transaction to proceed to ensure the victim (like an oil pipeline company, nuclear powerplant, or a federal aviation authority) regains access to their systems. However, the payment is effectively quarantined by the protection parameter, meaning that the ransomware attacker can't immediately use the transferred funds. The funds remain in this sequestered state until a proof of integrity (PoI) is provided, which could involve verification of the transaction's legitimacy. Similarly, in instances of suspected money laundering or tax evasion, funds moved in a manner indicative of illicit activity are processed but are simultaneously marked by the protection parameter. This action does not block the transaction but restricts the immediate use of the funds, placing them in a neutralized state. To regain access to these funds, a proof of integrity—such as documentation legitimizing the transaction or evidence negating suspicions of financial misconduct—must be submitted and verified. This improved technological solution allows for the flexibility in exchange processing while establishing a robust mechanism to control and protect the use of digital assets in sensitive scenarios.

Referring now to FIG. 5, a block diagram illustrating PoI integration into a blockchain 500, according to some arrangements. Generally, a blockchain includes a series of interconnected blocks, each containing a distinct set of data and metadata. As shown, block 510 in blockchain 500 is identified by a unique identifier, referred to as "Hash 1" (e.g., a cryptographic hash representing the block's content). Block 520, the subsequent block in blockchain 500, is linked to block 510 through the incorporation of "Hash 1" from Block 510. Similarly, Block 530, the next sequential block, is connected to Block 520 via "Hash 2" of Block 520, forming a continuous chain of blocks.

In some embodiments, each block in the blockchain is structured to include a header that contains information for the network's functionality and security. The block header can include a hash reference to the previous block. Additionally, the block header incorporates a consensus proof certificate or similar validation tool. This certificate represents the agreement of the network nodes on the validity of the block's transactions, achieved through the consensus model employed by blockchain 500 (e.g., Proof of Work, Proof of Stake). Furthermore, a feature in the block header is the inclusion of a proof of integrity (PoI) flag (protection parameter) or proof token. This PoI flag is a component for restricting the usage the funds or digital assets associated with the block. For example, the PoI flag might encode specific a freeze restriction on the funds until integrity proof can be provided. It should also be understood that while the block header contains these elements, additional data can also be stored within the block header as well as in the block's main body (i.e., block data).

Within blockchain 500, the Proof of Integrity (PoI) data can include one or more smart contracts, which are encoded with specific protection parameters as generated by one or more protection nodes. These smart contracts, embedded within the PoI portion of the block header, can govern the future use of the funds on the blockchain. In some embodiments, the smart contracts can be programmed to automatically execute when certain predefined conditions, encapsulated within the protection parameters, are met (e.g., an exchange of a portion of the funds previously flagged). For example, a smart contract might be set to validate a transaction only if proof of integrity is provided in an exchange request. Upon successfully provided a proof of integrity, these smart contracts can generate a certificate or token, which serves as a confirmation of compliance with the PoI model. This certificate or token can provide a verifiable record that the transaction adhered to the PoI protection parameters.

Additionally, an external ledger 140 can contain a ledger storing content items. The content items can be given a ledger address such that when new blocks are created, a pointer can be encapsulated within the block data structure or the blocks hash. As shown, the pointers (P) can be concatenated or appended to the blocks hash. In some embodiments, the pointers (P) can be added to the block data of the block data structure. For example, the content items can be document files, audio files, video files, or any other file that can be analyzed by the processing circuits of the DLT networks to flag potentially dangerous exchanges (e.g., ransomware, fraud, money laundering, cyber-attack, etc.). Each associated block, the block created for the exchange request that included the content item, can have a pointer to their respective content item (or content items). In some embodiments, the pointer can be to many content items. In some embodiments, multiple pointers could be added to the blocks data or blocks hash. In some embodiments, each ledger entry in the external ledger 140 can have multiple files or data structures associated with the particular ledger entries address.

In the context of blockchain 500, each participant in the blockchain network can possess a unique pair of keys: a private key, which is kept confidential, and a public key, which is shared openly on the network. For example, when a user initiates a transaction, such as transferring digital assets (e.g., from the bank to a merchant), they sign the transaction with their private key. This signature acts as a secure digital fingerprint, verifying the transaction's origin and authenticity. The public key, which is associated with the user's blockchain address, is then used by other network participants to verify the signature. If the signature matches the public key, it confirms that the transaction was indeed created by the holder of the corresponding private key and has not been altered since it was signed.

While this specification contains many specific implementation details and/or arrangement details, these should not be construed as limitations on the scope of any disclosure or of what may be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative arrangement described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations and/or arrangements described above should not be understood as requiring such separation in all implementations and/or arrangements, and it should be understood that the described program components and systems can generally be integrated together in a single software product or packaged into multiple software products.

Having now described some illustrative implementations, implementations, illustrative arrangements, and arrangements it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements and features discussed only in connection with one implementation and/or arrangement are not intended to be excluded from a similar role in other implementations or arrangements.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations and/or arrangements consisting of the items listed thereafter exclusively. In one arrangement, the systems and methods described herein consist of one, each combination of more than one, or all of the described elements, acts, or components.

Any references to implementations, arrangements, or elements or acts of the systems and methods herein referred to in the singular may also embrace implementations and/or arrangements including a plurality of these elements, and any references in plural to any implementation, arrangement, or element or act herein may also embrace implementations and/or arrangements including only a single element. References in the singular or plural form are not intended to limit the presently disclosed systems or methods, their components, acts, or elements to single or plural configurations. References to any act or element being based on any information, act or element may include implementations and/or arrangements where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

Any arrangement disclosed herein may be combined with any other arrangement, and references to "an arrangement," "some arrangements," "an alternate arrangement," "various arrangements," "one arrangement" or the like are not necessarily mutually exclusive and are intended to indicate that a particular feature, structure, or characteristic described in connection with the arrangement may be included in at least one arrangement. Such terms as used herein are not necessarily all referring to the same arrangement. Any arrangement may be combined with any other arrangement, inclusively or exclusively, in any manner consistent with the aspects and arrangements disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations and/or arrangements are illustrative rather than limiting of the described systems and methods. Scope of the systems and methods described herein is thus indicated by the appended claims, rather than the foregoing description, and changes that come within the meaning and range of equivalency of the claims are embraced therein.

It should be understood that no claim element herein is to be construed under the provisions of 35 U.S.C. § 112 (f) unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), math-based currencies (often referred to as cryptocurrencies), and central bank digital currency (often referred to as CBDC). Examples of math-based currencies include Bitcoin, Ethereum, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

What is claimed is:

1. A system, comprising:
a protection system configured to generate and deploy protection code to a plurality of protection nodes of a plurality of DLT networks;
a first DLT network of the plurality of DLT networks comprising a first plurality of nodes and a first protection node, the first DLT network configured to:
in response to receiving an exchange request from a node of the first plurality of nodes, generate an exchange record corresponding to an exchange of an amount of a digital asset, the exchange record comprising at least a source identifier, a destination identifier, and the amount of the digital asset;
validate, by the first protection node, the exchange record in the amount of the digital asset based on a protection model corresponding to the protection code, wherein validating comprises generating a protection parameter to append to the exchange record based on a content item;
authorize, based on a first consensus model, the exchange corresponding with the validated exchange record;
generate a new blockchain block on the first DLT network comprising the validated-authorized exchange record and the protection parameter;
transmit, to a gateway interface of a second DLT network, an exchange notification comprising the validated-authorized exchange record;
the second DLT network of the plurality of DLT networks comprising a second plurality of nodes and a second protection node, the second DLT network configured to:
receive the exchange notification from the gateway interface;
validate, by the second protection node, the exchange notification based on the protection model corresponding to the protection code;
authorize, based on a second consensus model, the exchange corresponding with the validated exchange notification;
credit the amount of the digital asset to a recipient account on the second DLT network corresponding with the destination identifier; and
generate a confirmation blockchain block on the second DLT network comprising the validated-authorized exchange notification and the protection parameter.

2. The system of claim 1, wherein validating, by the first protection node based on the protection model, comprises executing a dimensional analysis, using one or more smart contracts, of the content item and exchange information of the exchange request, and wherein the first DLT network and the second DLT network are further configured to receive, from the protection system, the protection code for executing the protection model.

3. The system of claim 2, further comprising:
an external ledger configured to store the content item and restrict access to a plurality of content items stored, the protection parameter comprising a pointer to the content item stored on the external ledger.

4. The system of claim 3, wherein the external ledger is accessible to the first protection node of the first DLT network and the second protection node of the second DLT network, and wherein the external ledger restricts access to other nodes of the first plurality of nodes of the first DLT network and other nodes of the second plurality of nodes of the second DLT network.

5. The system of claim 3, wherein the content item comprises multimedia data corresponding to the exchange, and wherein the protection parameter corresponds to a type of protection, wherein the type of protection corresponds with at least one of a ransom protection, a fraud protection, a financial anomaly protection, a variance protection, or a fiscal compliance protection.

6. The system of claim 1, wherein a use of the amount of the digital asset on the second DLT network is locked based on the protection parameter, and wherein the use of the amount of the digital asset is unlocked based on the second protection code receiving additional information corresponding with the exchange request, and wherein the protection model is a proof of integrity algorithm.

7. The system of claim 1, wherein the first DLT network is further configured to:
communicably couple the node of the first DLT network to the second protection node of the second DLT network;
in response to receiving a confirmation from the node corresponding with the protection parameter, request a retrieval of the amount of the digital asset, wherein the confirmation comprises an indication the node received a return action based on the exchange;
receive, from the second protection node, a new exchange notification comprising a return exchange record corresponding with the amount of the digital asset; and
credit the amount of the digital asset to a sender account on the first DLT network corresponding with the source identifier.

8. The system of claim 1, wherein the second DLT network is further configured to:
receive, from a node of the second plurality of nodes on the second DLT network, a subsequent exchange request for a subsequent exchange of at least a portion of the amount of the digital asset; and
prohibit the subsequent exchange based on the protection parameter on the confirmation blockchain block.

9. A method, comprising:
receiving, by at least one processing circuit from a node on a first DLT network, an exchange request for an exchange, the exchange request comprises an amount of a digital asset to exchange, a content item, and a destination identifier;
generating, by the at least one processing circuit, an exchange record corresponding to the exchange of the amount of the digital asset, the exchange record comprising at least a source identifier, the destination identifier, and the amount of the digital asset;
validating, by the at least one processing circuit, the exchange record in the amount of the digital asset based on a protection model, wherein validating comprises generating a protection parameter to append to the exchange record based on the content item;
authorizing, by the at least one processing circuit based on a consensus model, the exchange corresponding with the validated exchange record comprising the appended protection parameter;
generating, by the at least one processing circuit, a new blockchain block on the first DLT network comprising the validated-authorized exchange record; and
transmitting, by the at least one processing circuit to a gateway interface of a second DLT network, an exchange notification comprising the validated-authorized exchange record.

10. The method of claim 9, wherein validating, based on the protection model, comprises executing a dimensional analysis, using one or more smart contracts, of the content item and exchange information of the exchange request, and wherein the method further comprises receiving, by the at least one processing circuit from a protection system, protection code for executing the protection model, and wherein validating is performed by a protection node of a plurality of nodes of the first DLT network, and wherein validating further comprises storing the content item on an external ledger, the protection parameter comprising a pointer to the content item stored on the external ledger.

11. The method of claim 10, wherein the content item comprises multimedia data corresponding to the exchange, and wherein the protection parameter corresponds to a type of protection, wherein the type of protection corresponds with at least one of a ransom protection, a fraud protection, a financial anomaly protection, a variance protection, or a fiscal compliance protection.

12. The method of claim 10, wherein the validated-authorized exchange record is transmitted via the gateway interface to a protection node of a plurality of nodes of the second DLT network, wherein the protection node of the second DLT network comprises the protection code for executing the protection model, and wherein a use of the amount of the digital asset on the second DLT network is locked based on the protection parameter, and wherein the protection model is a proof of integrity algorithm.

\* \* \* \* \*